US012045701B2

(12) United States Patent
Mahadik

(10) Patent No.: US 12,045,701 B2
(45) Date of Patent: Jul. 23, 2024

(54) DYNAMICALLY ADJUSTING A SERVERLESS EXECUTION CONTAINER POOL FOR TRAINING AND UTILIZING ONLINE MACHINE-LEARNING MODELS

(71) Applicant: Adobe Inc., San Jose, CA (US)

(72) Inventor: Kanak Mahadik, San Jose, CA (US)

(73) Assignee: Adobe Inc., San Jose, CA (US)

( * ) Notice: Subject to any disclaimer, the term of this patent is extended or adjusted under 35 U.S.C. 154(b) by 973 days.

(21) Appl. No.: 17/030,730

(22) Filed: Sep. 24, 2020

(65) Prior Publication Data

US 2022/0092480 A1 Mar. 24, 2022

(51) Int. Cl.
*G06N 20/10* (2019.01)
*G06F 9/455* (2018.01)

(52) U.S. Cl.
CPC ......... *G06N 20/10* (2019.01); *G06F 9/45558* (2013.01); *G06F 2009/45587* (2013.01)

(58) Field of Classification Search
CPC .... G06N 20/00; G06N 20/10; G06F 9/45558; G06F 9/45533; G06F 9/455; G06F 2009/45587
USPC .......................................................... 706/12
See application file for complete search history.

(56) References Cited

U.S. PATENT DOCUMENTS

| | | | |
|---|---|---|---|
| 9,923,785 B1 * | 3/2018 | Li | H04L 41/40 |
| 10,263,908 B1 * | 4/2019 | Ganjoo | H04L 41/5067 |
| 11,004,025 B1 * | 5/2021 | Gottin | G06N 7/01 |
| 11,082,333 B1 * | 8/2021 | Lam | H04L 47/803 |
| 2008/0005736 A1 * | 1/2008 | Apacible | G06F 12/0868 718/100 |
| 2012/0254444 A1 * | 10/2012 | Harchol-Balter | G06F 9/06 709/226 |
| 2018/0101403 A1 * | 4/2018 | Baldini Soares | G06Q 20/22 |
| 2020/0004903 A1 * | 1/2020 | Gottin | G06F 30/20 |
| 2021/0263779 A1 * | 8/2021 | Haghighat | G06F 9/5061 |

(Continued)

FOREIGN PATENT DOCUMENTS

EP 3561671 A1 * 10/2019 ............. G06F 9/505

OTHER PUBLICATIONS

Mao et al., "Resource management with deep reinforcement learning", Proceedings of the 15th ACM workshop on hot topics in networks, Nov. 2016, pp. 50-56. (Year: 2016).*

(Continued)

*Primary Examiner* — Hwei-Min Lu
(74) *Attorney, Agent, or Firm* — Keller Preece PLLC

(57) ABSTRACT

The disclosure describes one or more implementations of a serverless computing management system that utilizes an online learning model to dynamically adjust the number of serverless execution containers in a serverless pool based on incoming data patterns. For example, for each time instance in a given time period, the serverless computing management system utilizes the online learning model to balance computing latency and computing cost to determine how to intelligently resize the serverless pool, such that the online machine-learning models in the serverless pool can update in a manner that improves accuracy and computing efficiency while also minimizing unnecessary delays. Further, the serverless computing management system provides a framework that facilitates state-based training of online machine-learning models in a stateless and serverless cloud-based environment.

20 Claims, 12 Drawing Sheets

(56) References Cited

U.S. PATENT DOCUMENTS

| | | | | |
|---|---|---|---|---|
| 2021/0319355 A1* | 10/2021 | Abiraman | | G06N 20/00 |
| 2021/0367868 A1* | 11/2021 | Chen | | H04L 47/762 |
| 2022/0021601 A1* | 1/2022 | Zheng | | H04L 45/123 |

OTHER PUBLICATIONS

Feng et al., "Exploring Serverless Computing for Neural Network Training", 2018 IEEE 11th International Conference on Cloud Computing, Jul. 2018, pp. 334-341. (Year: 2018).*

Wang et al., "Distributed Machine Learning with a Serverless Architecture", IEEE INFOCOM 2019—IEEE Conference on Computer Communications, Apr. 2019, pp. 1288-1296. (Year: 2019).*

Bhattacharjee et al., "BARISTA: Efficient and Scalable Serverless Serving System for Deep Learning Prediction Services", 2019 IEEE International Conference on Cloud Engineering (IC2E), Jun. 2019, pp. 23-33. (Year: 2019).*

Das et al., "Performance Optimization for Edge-Cloud Serverless Platforms via Dynamic Task Placement", ARXIV ID: 2003.01310, Mar. 2, 2020. (Year: 2020).*

Suresh et al., "ENSURE: Efficient Scheduling and Autonomous Resource Management in Serverless Environments", 2020 IEEE International Conference on Autonomic Computing and Self-Organizing Systems (ACSOS), Aug. 2020, pp. 1-10. (Year: 2020).*

Gunasekaran et al., "Towards Designing a Self-Managed Machine Learning Inference Serving System in Public Cloud", ARXIV ID: 2008.09491, Aug. 21, 2020. (Year: 2020).*

AWS Lambda resource limits and restrictions. https://docs.aws.amazon.com/lambda/latest/dg/limits.html. Accessed: Sep. 12, 2019.

Google cloud function quotas. https://cloud.google.com/functions/quotas. Accessed: Sep. 13, 2019.

Wits: Waikato internet traffic storage. https://wand.net.nz/wits/index.php Accessed: Sep. 12, 2019.

Albers, S. Online algorithms: a survey. Mathematical Programming 97, 1-2 (2003), 3-26.

Ao, L., Izhikevich, L., Voelker, G. M., and Porter, G. Sprocket: A serverless video processing framework. In Proceedings of the ACM Symposium on Cloud Computing (2018), ACM, pp. 263-274.

Audibert, J.-Y., and Bubeck, S. Best arm identification in multi-armed bandits. Jun. 2010.

Fouladi, S., Wahby, R. S., Shacklett, B., Balasubramaniam, K. V., Zeng, W., Bhalerao, R., Sivaraman, A., Porter, G., and Winstein, K. Encoding, fast and slow: Low-latency video processing using thousands of tiny threads. In 14th fUSENIXg Symposium on Networked Systems Design and Implementation (fNSDIg 17) (2017), pp. 363-376.

Gama, J., Zliobaite , I., Bifet, A., Pechenizkiy, M., and Bouchachia, A. A survey on concept drift adaptation. ACM computing surveys (CSUR) 46, 4 (2014), 44.

He, X., Pan, J., Jin, O., Xu, T., Liu, B., Xu, T., Shi, Y., Atallah, A., Herbrich, R., Bowers, S., et al. Practical lessons from predicting clicks on ads at facebook. In Proceedings of the Eighth International Workshop on Data Mining for Online Advertising (2014), ACM, pp. 1-9.

Hoffman, M., Bach, F. R., and Blei, D. M. Online learning for latent dirichlet allocation. In advances in neural information processing systems (2010), pp. 856-864.

Karlin, A. R., Kenyon, C., and Randall, D. Dynamic tcp acknowledgement and other stories about e/(e-1). In Proceedings of the thirty-third annual ACM symposium on Theory of computing (2001), pp. 502-509.

Mcmahan, H. B., Holt, G., Sculley, D., Young, M., Ebner, D., Grady, J., Nie, L., Phillips, T., Davydov, E., Golovin, D., et al. Ad click prediction: a view from the trenches. In Proceedings of the 19th ACM SIGKDD international conference on Knowledge discovery and data mining (2013), ACM, pp. 1222-1230.

Schlimmer, J. C., and Granger, R. H. Beyond incremental processing: Tracking concept drift. In AAAI (1986), pp. 502-507.

Shankar, V., Krauth, K., Pu, Q., Jonas, E., Venkataraman, S., Stoica, I., Recht, B., and Ragan-Kelley, J. numpywren: serverless linear algebra. arXiv preprint arXiv:1810.09679 (2018).

Stern, D. H., Herbrich, R., and Graepel, T. Matchbox: large scale online bayesian recommendations. In Proceedings of the 18th international conference on World wide web (2009), ACM, pp. 111-120.

Tian, H., Yu, M., and Wang, W. Continuum: A platform for costaware, low-latency continual learning. In SoCC (2018), pp. 26-40.

Tsymbal, A. The problem of concept drift: definitions and related work. Computer Science Department, Trinity College Dublin 106, 2 (2004), 58.

Wang, L., Li, M., Zhang, Y., Ristenpart, T., and Swift, M. Peeking behind the curtains of serverless platforms. In 2018 fUSENIXg Annual Technical Conference (fUSENIXgfATCg 18) (2018), pp. 133-146.

Zhang, H., Lofgren, P., and Goel, A. Approximate personalized pagerank on dynamic graphs. In Proceedings of the 22nd ACM SIGKDD International Conference on Knowledge Discovery and Data Mining (2016), ACM, pp. 1315-1324.

Zhang, M., Krintz, C., Mock, M., and Wolski, R. Seneca: Fast and low cost hyperparameter search for machine learning models. In 2019 IEEE 12th International Conference on Cloud Computing (CLOUD) (2019), IEEE, pp. 404-408.

\* cited by examiner

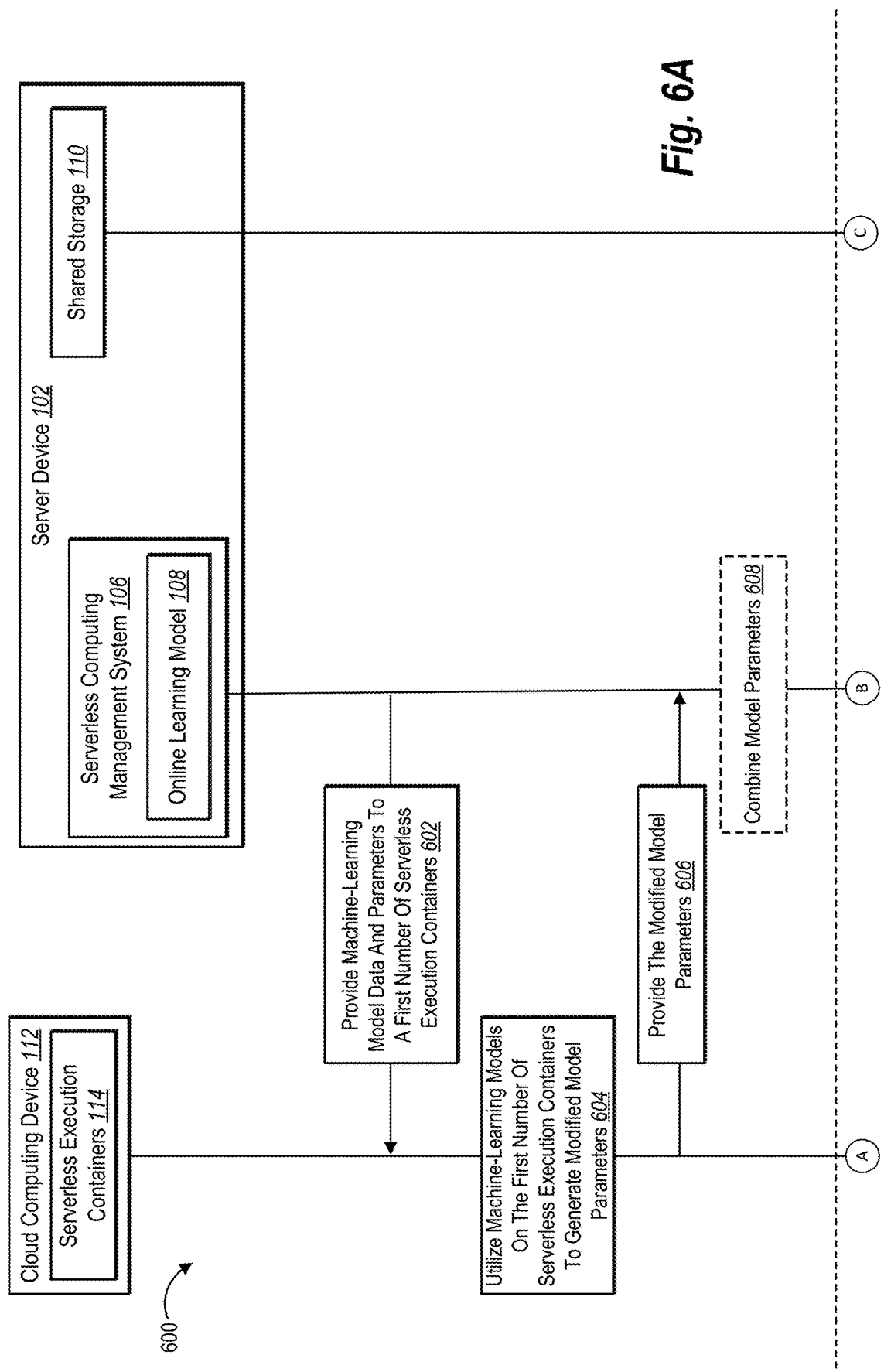

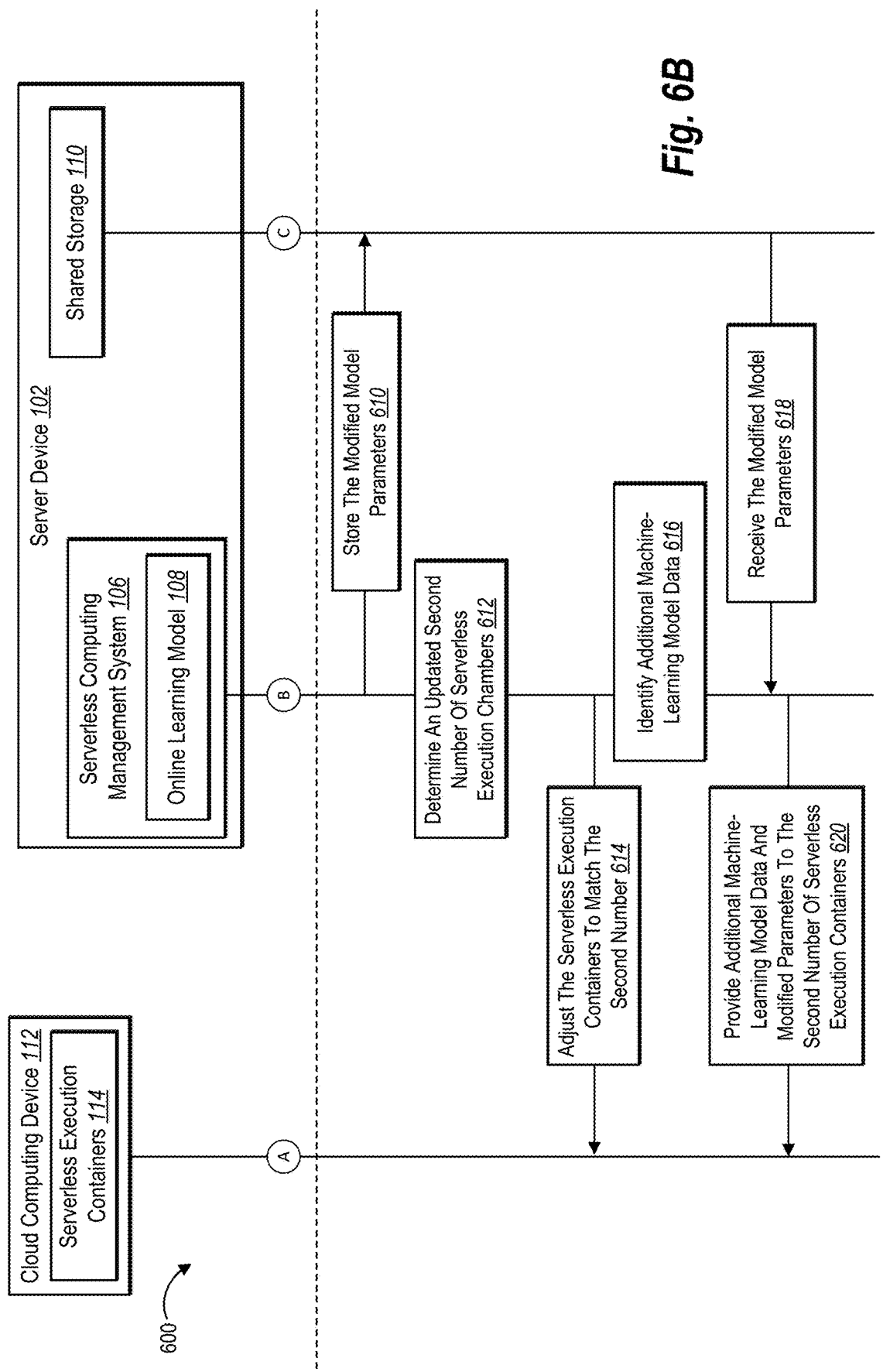

DYNAMICALLY ADJUSTING A SERVERLESS EXECUTION CONTAINER POOL FOR TRAINING AND UTILIZING ONLINE MACHINE-LEARNING MODELS

BACKGROUND

Recent years have seen significant improvements in hardware and software platforms for training and utilizing machine-learning models. For example, many conventional systems utilize machine-learning models that learn over time to improve in their ability to produce accurate results. Indeed, conventional systems can utilize machine-learning models in connection with cloud computing systems in an attempt to satisfy increasing demands for services provided through machine-learning.

Notwithstanding these improvements in the field of machine learning and cloud computing, conventional systems continue to suffer from a number of problems with regard to continuously updating machine-learning models. For example, some conventional systems train machine-learning models offline, which reduces model accuracy and results in irregular updates. Other conventional systems attempt online training; however, these systems are extremely wasteful in terms of computational processing and real-time memory usage. Additionally, some conventional systems can suffer from long delays when training online machine-learning models. Still, other conventional systems are unable to train machine-learning models online as various cloud computing systems do not support efficiently hosting online machine-learning models.

Accordingly, these along with additional problems and issues exist in existing solutions with respect to the technical field of training and utilizing online machine-learning models.

BRIEF SUMMARY

Implementations of the present disclosure provide benefits and/or solve one or more of the foregoing or other problems in the art with systems, non-transitory computer-readable media, and methods that accurately and efficiently utilize a pool of serverless execution containers to perform real-time, online training of machine-learning models. In particular, the disclosed systems provide a framework that facilitates continuous training of online machine-learning models in a serverless cloud-based environment. For instance, the disclosed systems utilize an online learning model that dynamically adjusts the number of serverless execution containers in a serverless execution container pool based on incoming data patterns. More particularly, for each time instance, the disclosed systems utilize the online learning model to balance computing latency and computing cost to determine how to optimally resize the serverless execution container pool such that online machine-learning models in the serverless execution container pool can update in a manner that maximizes accuracy and computing efficiency while also minimizing unnecessary delays and computing costs. The disclosed systems can also utilize dynamic logic and shared storage resources to impose stateful learning processes in a serverless cloud-based environment that is otherwise stateless.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

FIGS. 6A-6B illustrate a sequence diagram of training online machine-learning models on serverless execution container in accordance with one or more implementations.

DETAILED DESCRIPTION

Figure 1:
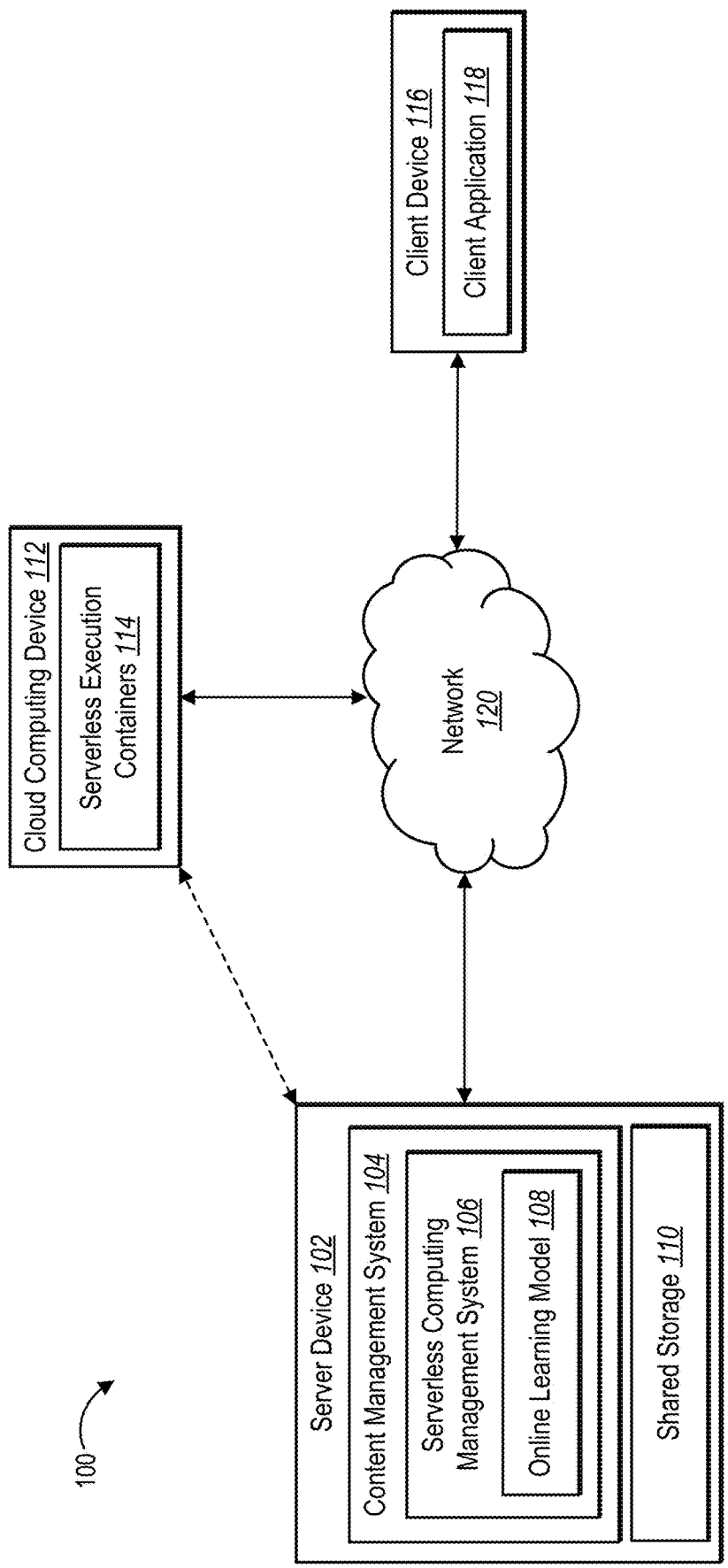
FIG. 1 illustrates a schematic diagram of a system environment in which a serverless computing management system can operate in accordance with one or more implementations.

This disclosure describes one or more implementations of a serverless computing management system that dynamically adjusts serverless execution container pools utilizing an online learning model to achieve improved accuracy and efficiency in training online machine-learning models. For instance, in various implementations, the serverless computing management system (or simply "serverless management system") utilizes an online learning model that intelligently selects a number of provisioned (e.g., warmed) serverless execution containers to utilize within a serverless execution container pool for continuously training online machine-learning models. For example, in several implementations, the serverless management system selects the number of serverless execution containers in a serverless execution container pool based on arrival patterns of incoming data while balancing computing costs and computing latency relative to a regret threshold. In one or more implementations, the serverless management system also provides a framework to overcome current obstacles of serverless execution containers (e.g., supporting only stateless applications) to facilitate continuously training the online machine-learning models via the serverless execution containers.

By way of context, serverless computing largely refers to an execution model, such as Function as a Service (FaaS), where a cloud computing system provides execution containers or functions to implement code or programs without the needing to set up, run, or maintain the underlying infrastructure. For example, the serverless management system utilizes serverless execution containers to build and run applications for users without the users needing to manage the servers or hardware that implements the code or applications.

In addition, many serverless computing systems are scalable, meaning that when additional computing resources (e.g., additional hardware, processing and/or memory capacity) are needed, the cloud computing system makes these resources available to the requesting system. For instance, the cloud computing system allocates additional serverless execution containers or deallocates serverless execution containers in response to requests by the serverless management system. However, as detailed below, adding and removing serverless execution containers can trigger a variety of issues, such as causing needless computing latency (e.g., due to cold start problems) or substantially increasing computing cost (e.g., by maintaining idle containers), as further described below.

As noted above, in several implementations, the serverless management system improves accuracy and efficiency of computing devices by intelligently selecting the number of provisioned serverless execution containers in a serverless execution container pool (or simply "container pool") based on arrival patterns of incoming data, computing costs, and computing latency. To illustrate, in one or more implementations, the serverless management system utilizes an online learning model to identify a computing latency and a computing cost for processing machine-learning model data that arrives over a given time period via the current number of serverless execution containers in the container pool. Further, the serverless management system utilizes the online learning model to determine an updated number of serverless execution containers for the pool of warmed serverless execution containers based on changes to computing latency and computing costs resulting from utilizing additional or fewer serverless execution containers in the container pool across the time period. In response, the serverless management system updates the number of serverless execution containers in the container pool to the updated number in anticipation of receiving fresh machine learning model data for the container pool to process.

In various implementations, the online learning model utilizes regret to determine the updated number of provisioned serverless execution containers to which to update the container pool. In general, the serverless management system implements an action based on a regret threshold being triggered. For example, by analyzing one or more regret thresholds the serverless management system can take actions such as increasing, decreasing, or maintaining the number of serverless execution containers in the container pool.

To illustrate, in one or more implementations, a regret threshold triggers when computing cost increases due to adding and provisioning additional containers. In other implementations, a regret threshold triggers when computing latency increases due to reducing the number of serverless execution containers. Depending on which regret threshold instance is used and how it is triggered, the serverless management system determines to increase, decrease, or maintain the number of serverless execution containers in the serverless execution container pool.

In one or more implementations, the regret threshold reflects to a change in computing latency and/or a change in computing cost over a time period. The serverless management system can compare computing latency change with computing cost change to determine if a regret threshold has been exceeded. Indeed, in some embodiments, the serverless management system weights the computing cost change (or the computing latency change) to indicate a prioritization between the two changes.

In some implementation, the serverless management system utilizes a maximum latency change as a regret threshold. For example, when determining whether to maintain or remove a serverless execution container from the container pool, the serverless management system can determine a latency change from applying a different number of serverless execution containers. The serverless management system can then compare the determined latency change to a maximum latency change to determine whether the change exceeds a regret threshold. Additional examples regarding triggering a regret threshold are provided below.

As mentioned above, in one or more implementations, the online learning model utilizes changes in computing latency and computing cost to determine how to modify the container pool. For example, in some implementations, the serverless management system determines computing cost based on applying a serverless execution container provisioning cost to the number of serverless execution containers in the container pool. Indeed, in various implementations, the computing cost includes the cost of starting and maintaining each of the serverless execution containers in the container pool.

In various implementations, the serverless management system determines computing latency based on data arrival patterns of machine learning model data within a time period and processing times for processing the model data utilizing the number of serverless execution containers in the container pool. For example, the serverless management system determines a change in computing latency based on increasing or decreasing the number of serverless execution containers in the container pool at different time instances within the time period.

As mentioned above, in some implementations, the serverless management system provides a framework for executing stateful operations in a serverless cloud computing environment. As explained below, serverless execution containers are often stateless and do not natively support training states for updating parameters within online machine-learning models. Accordingly, in one or more implementations, the serverless management system utilizes a shared storage separate from serverless execution containers that enables continuous training of online machine-learning models across multiple serverless execution containers.

For example, in various implementations, the serverless management system provides machine learning model data (e.g., "training data" or simply "model data") to a serverless execution container newly provisioned with one or more corresponding online machine-learning models. Upon processing the model data, the serverless execution containers generate modified machine learning model parameters (or simply "modified model parameters"). The serverless management system stores, or causes to be stored, the modified model parameters on a shared storage medium, which can be located with the serverless management system or remotely located.

The serverless management system supports real-time, online machine learning model training. Accordingly, it can identify new training data in real-time and utilize this new machine learning model data to update machine learning model parameters. For example, in one or more embodiments, the serverless management system provides additional (e.g., newly received) machine learning model data to a new serverless execution container along with the modified model parameters from the shared storage. Thus, rather than training from scratch, the new serverless execution container applies the modified model parameters to the additional machine learning model data. Then, based on processing the additional model data, the new serverless execution container generates updated modified model parameters, which are stored in the shared storage for further training.

Accordingly, the serverless management system transforms a serverless framework (e.g., a stateless framework) into one suitable for online machine-learning model training. Indeed, the serverless management system can support continuous training loops of the machine-learning model by utilizing the shared storage to persist the machine learning model parameters of intermediary training iterations across multiple serverless execution containers. In this manner, online machine-learning models are able to be updated as new data is received, which allows the online machine-learning models to generate results with improved accuracy.

As mentioned above, conventional systems provide inadequate frameworks and lack support for continuously training online machine-learning models. Indeed, online learning models and applications need to train with data samples while the samples are fresh, which requires online training. However, conventional systems that attempt online training are met with technical challenges, such as inefficiently retaining unused resources at high computing costs, training at unpredictable intervals, inconsistently training for different durations, and otherwise incurring large computing costs. Accordingly, most conventional systems abandon attempts to train online and rather, train online machine-learning models offline which itself results in inaccurate machine-learning models.

More particularly, because most conventional systems inadequately support continuous online model updating, they train online machine-learning models offline. For example, some conventional systems utilize virtual machines (or simply "VMs") in a cloud-based infrastructure to train online machine-learning models offline. These conventional systems, however, are inaccurate and inefficient. To illustrate, conventional systems that utilize VMs are inefficient in that they waste significant computing resources. For example, process large data arrival scenarios, these conventional systems need to provision and constantly maintain a fixed number (e.g., the maximum number) of resources to support peak demand, even when several of these resources sit idle from the majority of the time. As a result, these conventional systems often inefficiently provision and hold more resources than needed in anticipation of a large arrival of data, which is extremely wasteful and computationally costly. Indeed, by inefficiently reserving excess amounts of idle resources, other systems and processes are excluded from utilizing these resources.

Further, conventional systems that utilize VMs suffer from losses in accuracy due to not incorporating fresh data as it arrives. More specifically, continuously updating online machine-learning models as data arrives is needed to rapidly adapt to changes in user preferences and data patterns. Conventional systems that utilize VMs, however, delay model updates in favor of performing less complex offline training, which results in the trained models being out-of-date and inaccurate.

As mentioned above, some conventional systems attempt online training. For example, a few conventional systems utilize vanilla serverless frameworks supported by cloud-based computing systems to attempt online training. These conventional systems, however, are also inaccurate and inefficient. To illustrate, these conventional systems inefficiently suffer from high latency costs due to cold-start times. For example, only after data arrives do these systems determine if additional computing resources are needed. In these instances, these conventional systems request and wait for additional resources to be allocated. Allocating additional resources in a serverless environment, however, requires containers to be provisioned from scratch (e.g., to synchronize needed setup data and install software and packages). This cold start process introduces large computing latency delays and computing inefficiencies.

Further, conventional systems that utilize vanilla serverless frameworks inefficiently handle unpredictable data arrival scenarios. For example, these conventional systems update online machine-learning models irregularly, have variable training durations, and unevenly utilize resources, each of which, introduces further inefficiencies. Indeed, because training data occurs erratically, these conventional systems cannot provision resources ahead of time since the exact resource requirements are not known. As a result, these conventional systems often hold on to resources longer than needed and incur unnecessary computing costs.

Additionally, many vanilla serverless frameworks are inaccurate. For example, these conventional systems utilize a significantly lighter training process. In particular, these conventional systems train with less data, simplify the machine-learning model, and/or train for shorter durations. As a result, each of these training processes produces machine-learning models that are less accurate than other trained machine-learning models.

Further, most vanilla serverless frameworks are stateless and do not support continuous model updating. Rather, each time new training data arrives, these conventional systems train the machine-learning model as if being trained for the first time. Then, when the serverless container implementing the machine-learning model closes, all trained data is lost. Because training is not continuous, these machine-learning models can generate inaccurate predictions when runtime data is applied to the model.

As previously mentioned, the serverless management system provides numerous advantages and benefits over conventional systems. To illustrate, in many implementations, the serverless management system improves both accuracy and efficiency of computing devices as well as the technical field of online machine-learning model training by utilizes an online learning model to adjust the number of serverless execution containers in a serverless execution container pool. For example, by increasing the number of warmed serverless execution containers in anticipation of receiving a surge in machine learning model data (or decreasing the number of containers when a drop in model data is expected), the serverless management system can improve both accuracy and efficiency by reducing both computing latency and computing cost.

Indeed, as mentioned above, in one or more embodiments the serverless management system utilizes an online learning model or agent that triggers container pool updates based on analyzing incoming data patterns of machine learning model data. For instance, the online learning model learns how and when to adjust the number of serverless execution containers (e.g., parallel workers of functions) in a container pool. By maintaining and dynamically adjusting the number of serverless execution containers in a pool of warmed serverless execution containers, the serverless management system can select a more optimal number of serverless execution containers and provision these serverless execution containers so that they are initialized and warmed when new machine learning model data is identified. Indeed, the serverless management system significantly reduces (or eliminates) cold start inefficiency problems as well as minimizes computing latency, both of which plague many conventional systems.

In many implementations, the serverless management system learns when to increase, decrease, or maintain the number of serverless execution containers in a container pool. In addition to increasing the number of serverless execution containers as disclosed above, the serverless management system decreases the number of serverless execution containers ahead of less machine learning model data arriving (and not increasing back for a period of time). In this manner, the serverless management system lowers computing costs by dropping unused serverless execution containers rather than inefficacy maintaining idle and costly resources. Indeed, the serverless management system learns to balance computing latency and computing cost to best adapt resources in accordance with machine learning model data patterns.

Further, the serverless management system increases efficiency by exploiting the parallelism architecture provided by serverless execution containers. For example, the serverless management system trains an online machine-learning model in a shorter time frame utilizing the serverless execution container pool. Additionally, in some implementations, the serverless management system trains an online machine-learning model on one or more serverless execution containers while using other serverless execution container to implement or execute the most up-to-date trained version machine-learning model.

Figure 8:
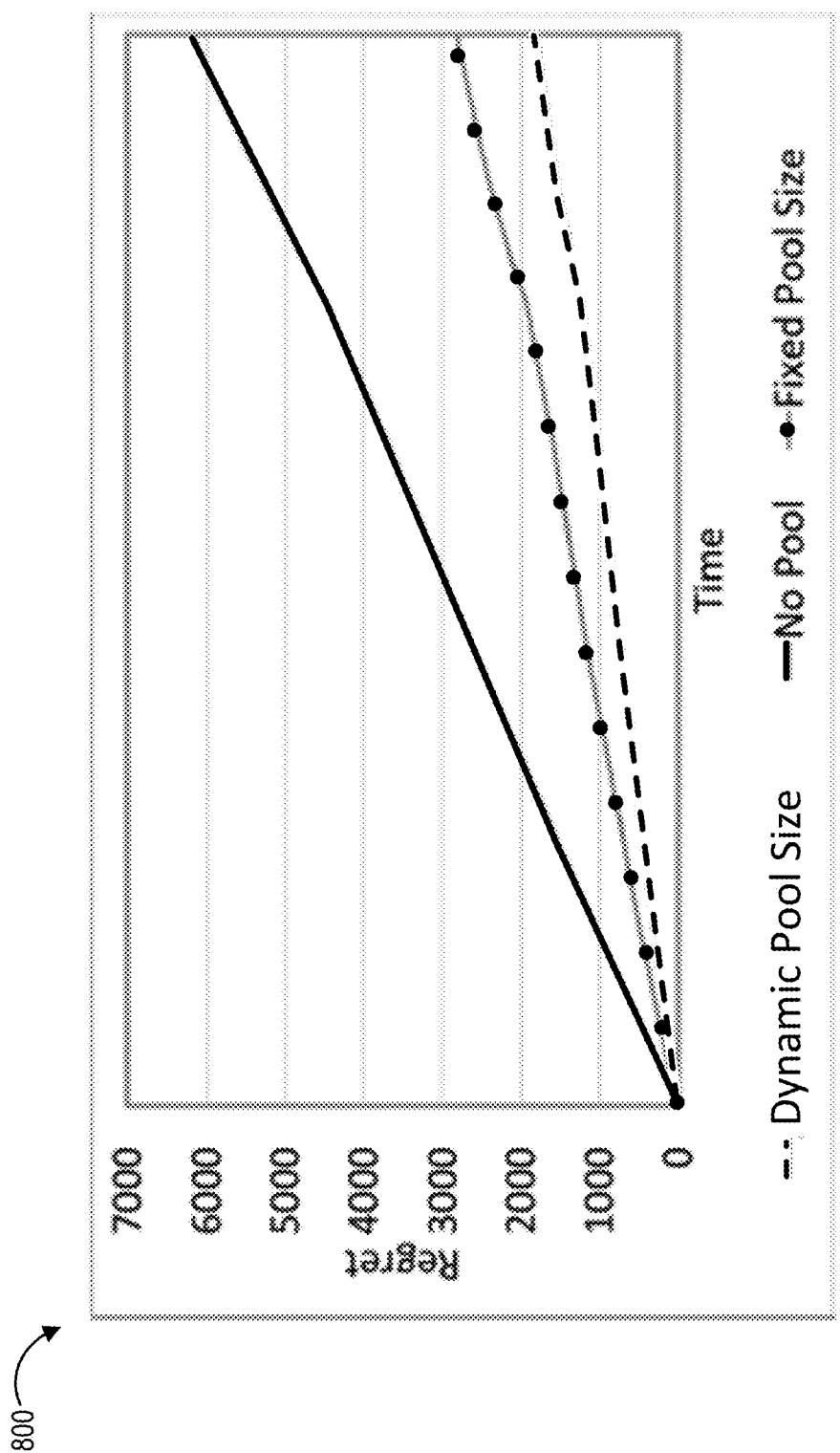
FIG. 8 illustrates a graph showing improvements by the online learning model in accordance with one or more implementations over baseline and alternative approaches.

As further described below with respect to FIG. 8, the serverless management system empirically outperforms conventional systems. For example, with respect to conventional systems that utilize VMs, implementations of the serverless management system perform 1.2 times faster and with 18 times more computing cost savings. Likewise, with respect to conventional systems that utilize vanilla serverless frameworks, implementations of the serverless management system perform 2.1 times and with 7 times more computing cost savings.

As mentioned above, the serverless management system provides improved accuracy. For example, by timely incorporating fresh model training data, the serverless management system generates more accurate online machine-learning models. In particular, as new machine-learning model data is identified, the serverless management system utilizes the model data to train one or more online machine-learning models. Indeed, the serverless management system does not delay or defer model updates, as with most conventional systems. Accordingly, by utilizing model data while still relevant and fresh, the serverless management system ensures that online machine-learning models train to produce highly accurate results and that are usable right away.

As another example, the serverless management system provides improved accuracy by facilitating continuous training of online machine-learning models. As mentioned above, many serverless frameworks are stateless and do not support continuous model updating. Accordingly, the serverless management system improves stateless serverless platforms to support stateful requirements needed by online learning applications. For example, in a number of implementations, the serverless management system utilizes shared storage to make the machine-learning models stateful and perform continuous training. In this manner, rather than training from scratch at each iteration, online machine-learning models train from a previous training iteration, which results in faster training and more accurate model predictions.

Referring now to the figures, FIG. 1 illustrates a schematic diagram of a system environment 100 in which a serverless computing management system 106 can operate in accordance with one or more implementations. As shown in FIG. 1, the system environment 100 (or simply "environment 100") includes a server device 102, a cloud computing device 112, and a client device 116 connected via a network 120. Additional detail regarding these computing devices is provided below in connection with FIG. 11. In addition, FIG. 11 also provides additional detail regarding networks, such as the illustrated network 120.

Although FIG. 1 illustrates a particular number, type, and arrangement of components within the environment 100, various additional environment configurations are possible. For example, the server device 102 can represent a set of connected server devices. As another example, the cloud computing device can represent a cloud computing system and/or include any number of computing devices. As a further example, the server device 102 may communicate directly with the cloud computing device 112 (shown with the dashed line), bypassing the network 120 or utilizing a separate and/or an additional network.

As shown, the server device 102 includes a content management system 104 and a shared storage 110. The content management system 104, in various implementations, can identify, receive, access, open, load, edit, modify, move, copy, share, save, remove, delete, store, download, transmit, and/or import digital content (e.g., text or graphics). For instance, the content management system 104 can manage digital content items that include images and/or text. Examples of content can range from graphical displays of content to items for purchase to digital advertisements. For ease of explanation, details of the shared storage 110 are provided further below.

As illustrated, the content management system 104 includes a serverless computing management system 106 (or simply "serverless management system 106"). While shown within the content management system 104, in various implementations, the serverless management system 106 is located apart from the content management system 104. Further, in some implementations, the serverless management system 106 is implemented on a client device (e.g., the client device 116) or across multiple computing devices (e.g., on both the server device 102 and the client device 116).

In one or more implementations, the serverless management system 106 determines the number of serverless execution containers 114 to keep warm in a container pool for a given time instance. For example, the serverless management system utilizes an online learning model 108 to determine whether to increase, decrease, or maintain the number of serverless execution containers 114 in a container pool (e.g., serverless execution containers often have fixed bandwidth capacity, but the number of serverless execution containers in the container pool can be expanded or reduced). Additionally, in various implementations, the serverless management system 106 facilitates the training of online machine-learning models via the serverless execution containers 114, as further described below.

As mentioned above, in one or more implementations, the online learning model 108 learns to determine whether to increase, decrease, or maintain the number of serverless execution containers 114 in a serverless execution container pool of warm containers based on multiple factors and conditions. For example, in various implementations, the online learning model 108 utilizes arrival patterns of machine learning model data, computing latency, and computing cost across a time period to determine how to optimize the number of serverless execution containers 114 in a pool of warmed serverless execution containers.

Notably, while some implementations below describe the online learning model 108 as a particular algorithm (or set of operations), in various implementations, the online learning model 108 is performed by a other types of machine-learning models. For instance, in one or more implementations, the serverless management system 106 utilizes a neural network, a decision tree, bandit-based models, a logical regression model, or a support vector machine as the online learning model 108.

As shown, the environment 100 includes the cloud computing device 112. In one or more implementations, the cloud computing device 112 includes multiple serverless execution containers 114. In various implementations, the cloud computing device 112 includes one or more pools of warmed serverless execution containers (e.g., the serverless execution containers 114 form a container pool). As described below, the cloud computing device 112 can add or remove serverless execution containers 114 from a container pool. When a new serverless execution container is added, the cloud computing device 112 and/or serverless management system 106 warms the serverless execution container past a cold start by initializing, installing, provisioning, and/or loading it with software (e.g., code and/or packages) such that it is ready to run one or more functions.

As mentioned above, the server device 102 can include the shared storage 110. While the shared storage 110 is shown on the server device 102, in alternative implementations, the shared storage 110 is located on the cloud computing device 112 or on another computing device not shown (e.g., a cloud storage device). For example, in one or more implementations, the cloud computing device 112 provides shared storage in connection with the serverless execution containers 114. Further, in some implementations, the environment 100 includes more than one shared storage device.

In various implementations, the shared storage 110 includes a shared storage medium where multiple computing devices can store and access data to be shared across devices. For instance, the serverless management system and/or the serverless execution containers can access as well as store data (e.g., machine learning model data) within the shared storage 110. For example, in various implementations, machine learning model training data, machine learning model parameters, ground truth data, machine-learning model software and packages, and/or other model data can be stored at and retrieved from the shared storage 110 by the serverless management system 106 or the serverless execution containers 114.

As illustrated in FIG. 1, the environment 100 includes the client device 116. In some implementations, the client device 116 enables a user (e.g., an administrator) to manage the serverless management system 106. For instance, a client application 118 on the client device 116 provides access to the serverless management system 106 from the client device 116. For example, in various implementations, the client application 118 is a web browser or a mobile application corresponding to the content management system 104.

In one or more implementations, the client device 116 corresponds to a user that interacts with the content management system 104 (e.g., via a client application 118 such as a web browser or a mobile application that accesses digital content.). For example, based on interactions with digital content detected from the client device 116, the serverless management system 106 utilizes one or more online machine-learning models on the serverless execution container 114 to provide additional content to the client device 116.

Figure 2:
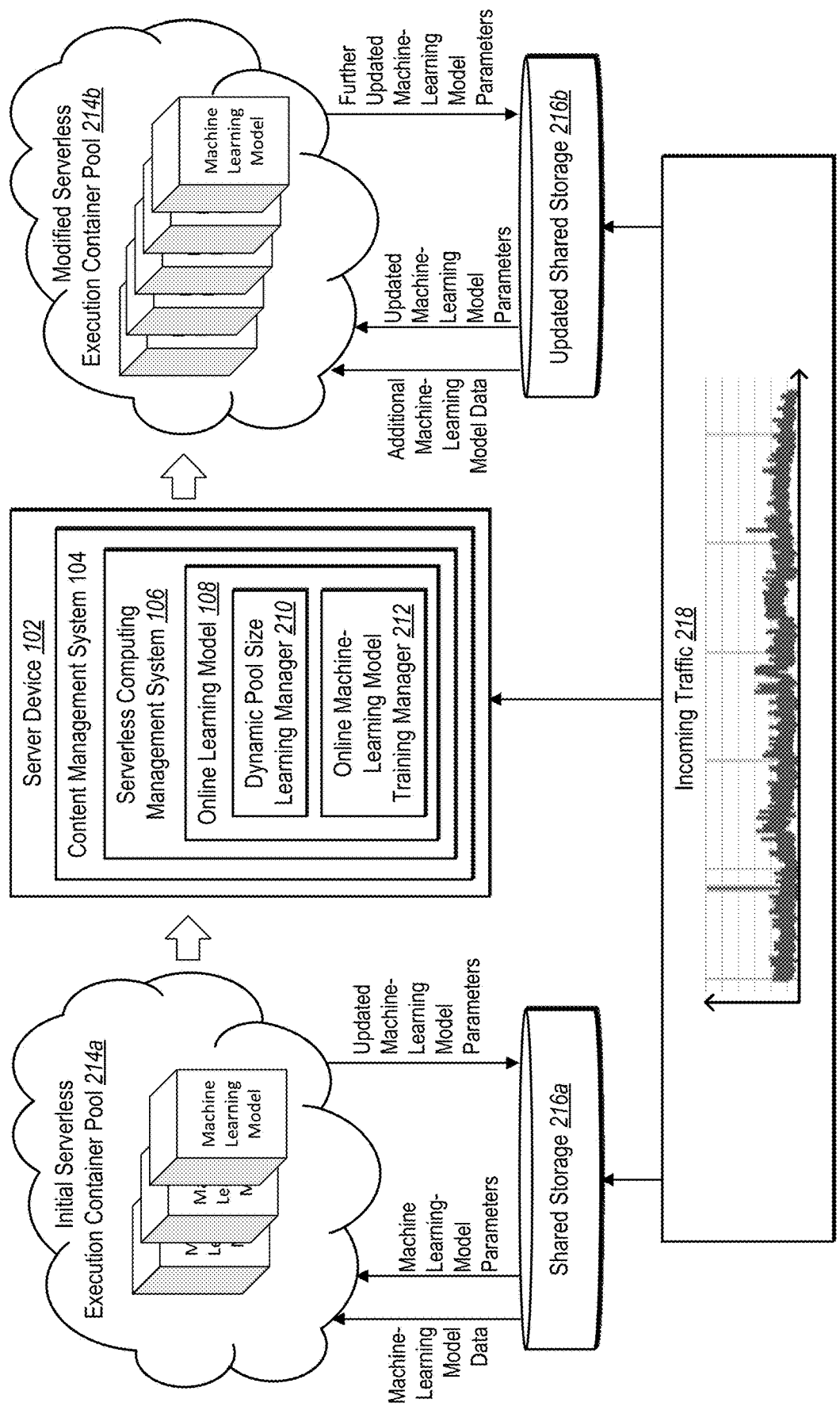
FIG. 2 illustrates an overview diagram of optimizing serverless execution container pools for continuously training online machine-learning models in accordance with one or more implementations.

While FIG. 1 shows an environment 100 where the serverless management system can operate, FIG. 2 shows interactions between the serverless management system, a pool of serverless execution containers, and shared storage. To illustrate, FIG. 2 shows an overview diagram of optimizing serverless execution container pools for continuously training online machine-learning models in accordance with one or more implementations.

FIG. 2 shows the server device 102 having the content management system 104 and the serverless computing management system 106 (or simply "serverless management system 106"). On the left, FIG. 2 illustrates an initial serverless execution container pool 214a and a shared storage 216a for a first time. On the right, FIG. 2 illustrates an updated serverless execution container pool 214b and an updated shared storage 216b for a second time. As shown, based on actions implemented at the serverless management system 106, the serverless execution container pool updates from the initial serverless execution container pool 214a at the first time (with a first number of serverless execution containers) to the updated serverless execution container pool 214b at the second time (with a second number of serverless execution containers). Likewise, data in the shared storage also updates between the first time and the second time.

As illustrated, the shared storage 216a (and updated shared storage 216b) is located apart from the serverless execution container pools and server device 102. In some implementations, the shared storage 216a/updated shared storage 216b is located on the server device 102, as shown in FIG. 1. In alternative implementations, the shared storage 216a/updated shared storage 216b is located in a cloud computing device and/or cloud computing system that hosts the serverless execution container pool.

In addition, FIG. 2 illustrates incoming traffic 218. In various implementations, the incoming traffic 218 includes machine learning model data. As discussed, the serverless management system 106 can constantly receive updated machine learning model data over time. Accordingly, as shown, the incoming traffic 218 varies over time. Additionally, in various implementations, the incoming traffic 218 is provided to the serverless management system 106 as well as the serverless execution container pools as additional traffic is identified.

As shown, the serverless management system 106 includes the online learning model 108, which has a dynamic pool size learning manager 210 and an online machine-learning model training manager 212. In one or more implementations, the dynamic pool size learning manager 210 intelligently determines a number of serverless execution containers to keep warm in the container pool. For example, in some implementations, the dynamic pool size learning manager 210 utilizes machine-learning model to determine to increase, decrease, or maintain the number of warm serverless execution containers in the container pool.

To illustrate, the initial serverless execution container pool 214a on the left includes three serverless execution containers. In one or more implementations, based on analyzing arrival patterns of the incoming traffic 218 (e.g., machine learning model data) over a time period, the dynamic pool size learning manager 210 determines to increase the number of warm serverless execution containers in the pool. For example, the dynamic pool size learning manager 210 sends a command to the serverless execution container pool to add two additional serverless execution containers. Accordingly, as shown in FIG. 2, the updated serverless execution container pool 214b on the right includes five serverless execution containers. In this manner, the updated serverless execution container pool 214b is better equipped to process an anticipated increase in incoming traffic 218 for the second time with a reduced computing latency (and an acceptable increase in computing cost).

While FIG. 2 shows the updated serverless execution container pool 214b increasing the number of serverless execution containers in the pool, in various implementations, the updated serverless execution container pool 214b removes serverless execution containers from the container pool based on a determination by the dynamic pool size learning manager 210. In these implementations, computing costs are reduced as serverless execution containers are deallocated when not anticipated to be utilized in the near future (with an acceptable rise in computing latency). Further, in some implementations, the dynamic pool size learning manager 210 determines that removing or maintaining the same number of serverless execution containers in the container pool may improve either computing latency or computing costs in the second time period.

As mentioned above, in one or more implementations, the dynamic pool size learning manager 210 utilizes the arrival patterns of incoming traffic 218 (e.g., machine learning model data) when determining whether to adjust the container pool. To elaborate, as mentioned above, online machine-learning models implemented on serverless execution containers train incrementally as new and/or fresh data becomes available. However, machine learning model training data often arrives at different times, frequencies, concentrations, and quantities (e.g., in different incoming data patterns).

Accordingly, in various implementations, the dynamic pool size learning manager 210 monitors arrival patterns of the machine learning model data measured across a time period, and based on the arrival of model data at each instance within the time period, determines whether the serverless execution container pool should be adjusted for a given time instance. Additional detail regarding the serverless management system 106 and/or online learning model 108 determining the optimal number of serverless execution containers to include in a container pool is described below in connection with FIGS. 3-5

As mentioned above, the online learning model 108 in the serverless management system 106 includes the online machine-learning model training manager 212 (or simply "online model training manager 212"). In general, the online model training manager 212 facilitates training online machine-learning models located on the serverless execution containers within the pool. More particularly, the online model training manager 212 enables continuous and incremental training of online machine-learning models, even though serverless execution containers do not natively support online machine-learning training, and even when training a machine-learning model occurs across different serverless execution containers.

To illustrate, as mentioned above, FIG. 2 includes the initial serverless execution container pool 214a and the shared storage 216a. As mentioned above, the initial serverless execution container pool 214a includes serverless execution containers. In general, a serverless execution container includes a computing architecture where code is executed on-demand (e.g., a function as a service (FaaS) platform in a cloud computing environment). Indeed, in a serverless environment, computing processes are performed on an as-needed basis through serverless execution containers (sometimes referred to as serverless functions). Thus, rather than renting or hosting server space (as described above with conventional systems), serverless environments allow clients to set up and activate serverless execution containers to run processes as needed. Although processes performed by serverless execution containers are often still technically performed on server devices, the environment and containers are termed to be "serverless" because the client does not own, rent, or procure fixed server space. Accordingly, in some implementations, serverless execution containers 114 include containers or functions implemented in a serverless environment (e.g., the cloud computing device 112).

As shown, the serverless execution containers within the initial serverless execution container pool 214a execute machine-learning models. Indeed, in many implementations, the serverless execution containers 114 utilize one or more machine-learning models to process machine-learning model data. By way of context, machine-learning models include algorithms that model high-level abstractions in data by generating data-driven predictions or decisions from the known input data. Examples of machine-learning models include computer representation that can be tuned (e.g., trained) based on inputs to approximate unknown functions. For instance, a machine-learning model can include a model that utilizes algorithms to learn from, and make predictions on, known data by analyzing the known data to learn to generate outputs that reflect patterns and attributes of the known data. For example, machine-learning models can include latent Dirichlet allocation (LDA), multi-arm bandits models, linear regression models, logistical regression models, random forest models, support vector machines (SVG) models, neural networks (convolutional neural networks, recurrent neural networks such as LSTMs, graph neural networks, etc.), decision tree models, bandit-based models (such as a multi-barmed bandit model), or personal PageRank (PPR) models.

In one or more implementations, serverless execution containers include online machine-learning models. An online machine-learning model includes a machine-learning model that learns as training data becomes available. As a result, an online machine-learning model often trains incrementally (e.g., "online" refers to the model continuously evolving or improving through sequential learning). Indeed, machine-learning model data utilized to train an online machine-learning model can arrive in size ranging from small sets (e.g., one user) to large sets (e.g., a flash crowd). Model data can also arrive at irregular intervals. Moreover, online machine-learning models can be utilized to generate predictions and decisions in one time period, then trained based on the arrival of new data in the next time period.

As shown in FIG. 2, the machine-learning models (e.g., online machine-learning models) in the serverless execution container pool receive machine learning model data and machine learning model parameters from the shared storage 216*a*. In some implementations, the machine learning model data provides instructions for setting up or generating an online machine-learning model. For example, the machine learning model defines the architecture of the online machine-learning model.

In one or more implementations, the machine learning model data includes training data used to tune an online machine-learning model. To illustrate, machine learning model data can include training inputs and corresponding ground truth labels. For example, an online machine-learning model can generate a predicted output based on inputted training data as well as evaluate the generated output for an error metric based on comparing ground truths corresponding to the inputted training data (e.g., supervised learning). Further, the online machine-learning model can utilize the evaluation to train and tune (e.g., modify machine learning model parameters) to generate more accurate predictions in the future. Thus, in a machine learning model trained to classify users of client devices, machine learning model data can include features regarding the client devices and a ground truth classification corresponding the users of the client devices.

In some implementations, machine-learning model data includes input or query data that a trained online machine-learning model processes to make predictions or decisions. For example, if the online machine-learning model is trained to provide personalized recommendations, in response to feedback from a user, the online machine-learning model recommends one or more items to the user.

As mentioned above, in various implementations, the serverless execution containers in the initial serverless execution container pool 214*a* receive machine learning model parameters from the shared storage 216*a*. In some instances, machine learning model parameters include one or more values or weights that influence how a portion of the model processes data. For example, a neural network that includes multiple layers can, at each layer, apply learned parameters or weights to modify input data and output the modified data (e.g., either to another layer or as a final output). In various implementations, machine learning model parameters can be imported and exported into an online machine-learning model (e.g., to and from the shared storage 110).

Indeed, as shown in FIG. 2, the initial serverless execution container pool 214*a* processes the machine-learning model parameters based on the machine learning model data to generate updated machine learning model parameters. Further, the updated machine-learning model parameters are provided to the shared storage 216*a* for storage and future retrieval by the serverless management system 106 and/or another serverless execution container hosting the online machine-learning model.

To further illustrate, as shown on the right side of FIG. 2, the updated serverless execution container pool 214*b* includes additional serverless execution containers. In response to receiving incoming traffic 218 at the second time period (e.g., additional machine learning model data), the shared storage 216*b* provides the additional machine learning model data as well as the updated machine-learning model parameters to the updated serverless execution container pool 214*b*. The updated serverless execution container pool 214*b* loads the updated machine learning model parameters, processes the additional machine learning model data, and generates further updated machine learning model parameters to the updated shared storage 216*b*.

By drawing on the shared storage 216*a*/updated shared storage 216*b*, the online machine-learning model is able to operate in a stateful manner in an otherwise stateless supported environment. For example, rather than inefficiently training from scratch (e.g., a random set of parameters), a newly provisioned online machine-learning model can utilize the updated machine learning model parameters to modify its state to match the state of the model at the end of its most recent training iteration (e.g., processed on another serverless execution container).

Additionally, in one or more implementations, by utilizing the updated machine learning model parameters, the online model training manager 212 allows for efficient incremental training across different serverless execution containers, parallel training, as well as model training concurrent with the model operation. For example, if machine learning model data arrives while a first instance on an online machine-learning model is currently training, rather than waiting, the online model training manager 212 can train a second instance of the online machine-learning model on another serverless execution container. Further, in some implementations, the online model training manager 212 combines the concurrently generated updated machine learning model parameters and provides them to shared storage. Additional detail regarding continuously training online machine-learning models on serverless execution containers is provided below with respect to FIGS. 6A-7.

Figure 3:
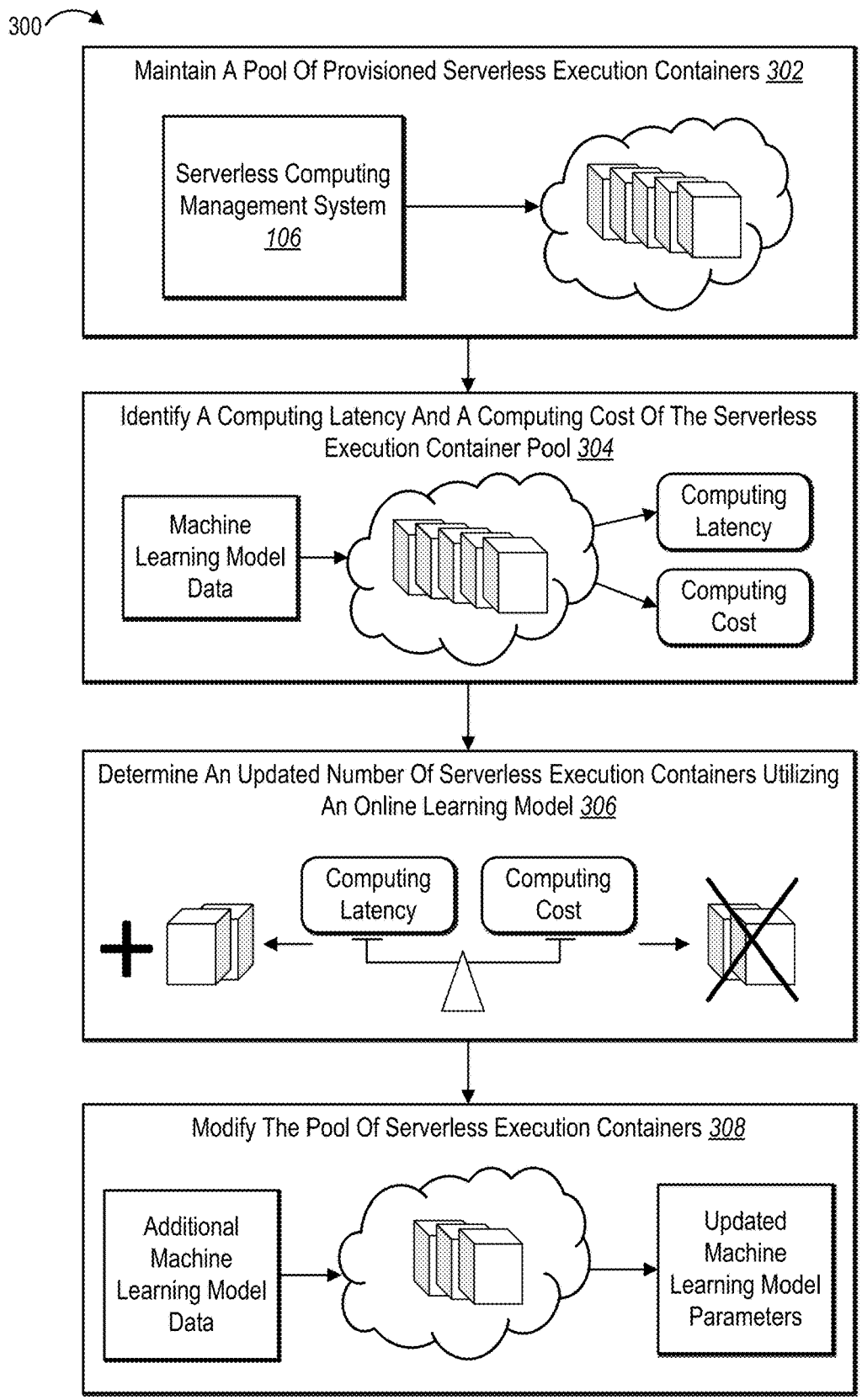
FIG. 3 illustrates a flow diagram of dynamically adjusting the capacity of a serverless execution container pool in accordance with one or more implementations.
Figure 4:
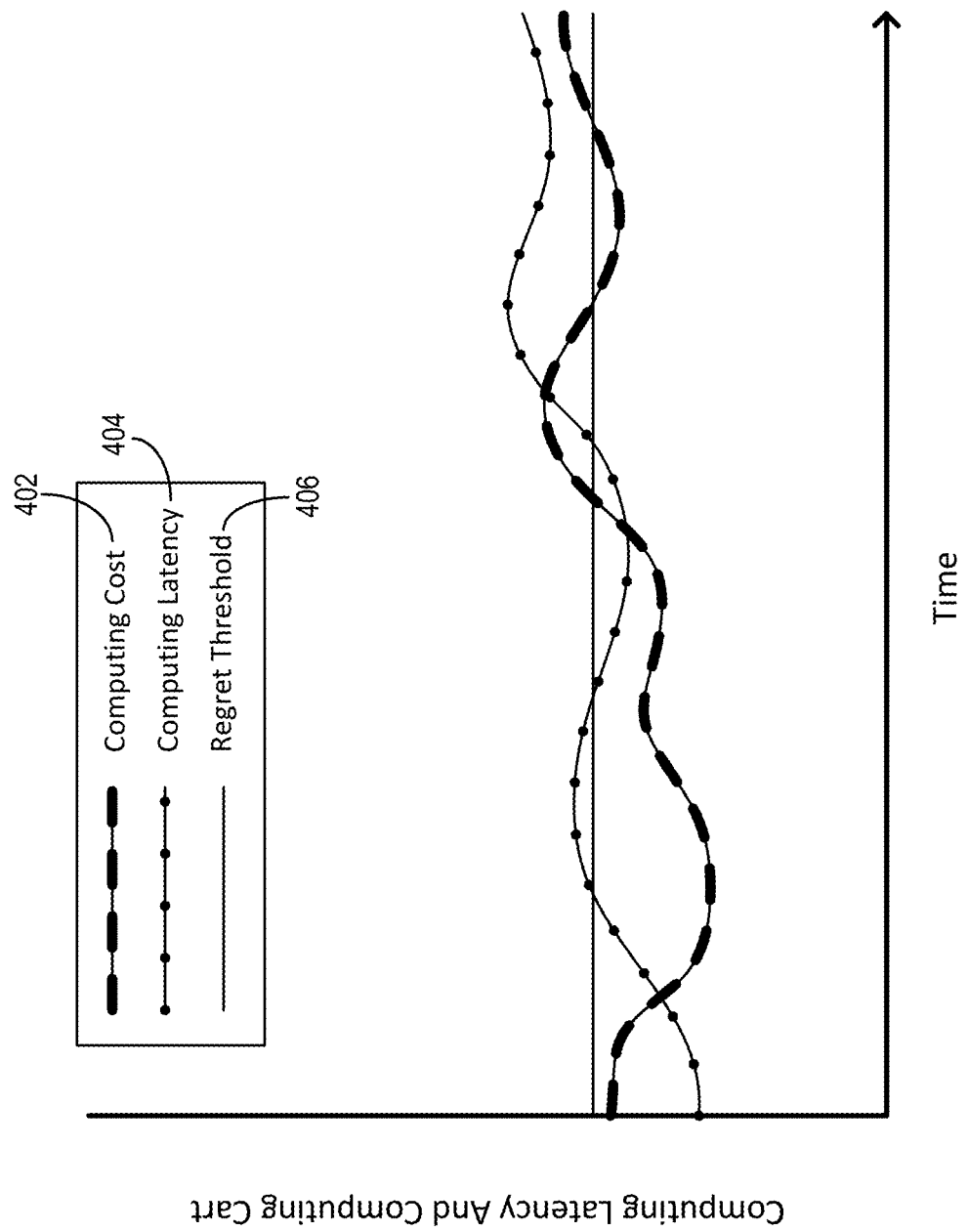
FIG. 4 illustrates a graph of computing latency, computing cost, and a regret threshold in accordance with one or more implementations.
Figure 5:
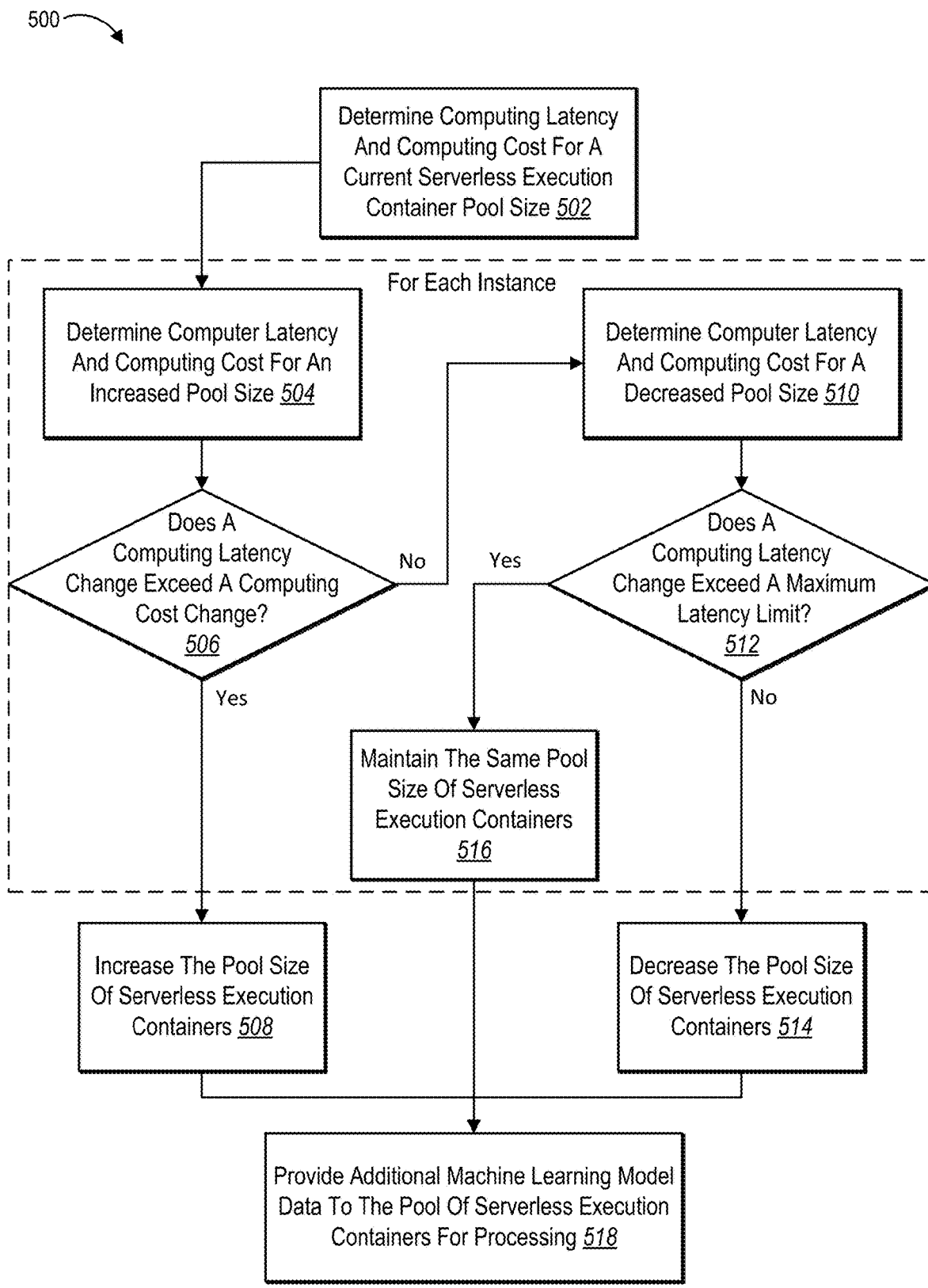
FIG. 5 illustrates a state diagram of an algorithm for dynamically adjusting the capacity of a serverless execution container pool in accordance with one or more implementations.

Turning now to FIGS. 3-5, additional detail is provided regarding determining the number (e.g., an optimal or near optimal number) of provisioned serverless execution containers to include in a serverless execution container pool. For example, FIG. 3 illustrates a flow diagram of dynamically adjusting the capacity of a serverless execution container pool in accordance with one or more implementations. In particular, FIG. 3 shows a series of acts 300 for dynamically adjusting a pool of serverless execution containers. In various implementations, the serverless management system 106 (i.e., serverless computing management system) implements actions in the series of acts 300.

As shown, the series of acts 300 includes an act 302 of maintaining a pool of provisioned serverless execution containers. For example, in one or more implementations, the serverless management system 106 communicates with a cloud computing device (or a cloud computing system) to utilize a pool of serverless execution containers. Further, the serverless management system 106 communicates with the cloud computing device to provision the serverless execution containers in the container pool with software and/or packages. For instance, in some implementations, a serverless execution container is installed with one or more online machine-learning models, as described above. Then, once provisioned, the serverless management system 106 maintains the pre-warmed functions (e.g., serverless execution containers) to process incoming machine learning model data.

As shown, the series of acts 300 includes an act 304 of identifying a computing latency and a computing cost of the serverless execution container pool. For example, the act 304 includes the serverless management system 106 determining computing latency based on the number of serverless execution containers in the serverless execution container pool as well as arrival patterns of the machine learning model data for a given period of time. In one or more implementations, computing latency includes the time needed for a computing device to perform an action or process an operation. For example, computing latency includes the time a serverless execution container takes to be initialized, installed, deployed, and/or provisioned to a warmed-up state. Often, a serverless execution container takes three or more seconds to be warmed after a cold start, which dramatically increases the latency of code and applications hosted on the serverless execution container.

Similarly, in various implementations, the act 304 includes the serverless management system 106 determining computing cost based on the number of serverless execution containers in the serverless execution container for the given period of time. In many implementations, computing costs include processing costs in terms of utilized computing resources, bandwidth, and power. In some implementations, computing cost is represented by monetary expenses corresponding to the consumption of computer resources. For example, a cloud computing device provides a serverless execution container for a particular cost and/or charge for utilized computing resources, bandwidth, and/or power.

As shown, the series of acts 300 includes an act 306 of determining an updated number of serverless execution containers utilizing an online learning model. As mentioned above, maintaining a large fixed number of serverless execution containers is often be wasteful in terms of computing cost while maintaining fewer containers than necessary will lead to additional computing latency (e.g., cold-starts). Accordingly, the serverless management system 106 utilizes the online learning model 108 to predict how many containers to be warmed at each point in time. Indeed, in many implementations, at each time instance, the serverless management system 106 determines to increase, decrease, or keep the number of warm containers in the serverless execution container pool.

In some implementations, the act 306 includes determining if utilizing more or fewer serverless execution containers to process the machine learning model data during the given time period would have resulted in regret with regard to computing latency or computing cost. Indeed, the serverless management system 106 can determine if adding or removing a serverless execution container from the serverless execution container pool at any point in time during the given time period would remain within a regret threshold. Often, the regret threshold is based on balancing changes in computing latency to changes in computing cost.

More specifically, a regret threshold or term includes a measure comparing a first decision and an alternate (e.g., more optimal) decision. In many implementations, the serverless management system 106 and/or the online learning model 108 measures regret in terms of computing latency or computing costs. For example, the serverless management system determines how changing the number of serverless execution containers in a pool (e.g., increasing or decreasing) would affect regret based on the arrival patterns of machine learning model data over various time periods. In some implementations, regret is measured as a computing cost increase due to provisioning more containers to keep warm. In various implementations, regret is measured as a computing latency increase due to reducing the number of containers. Indeed, when a regret threshold is triggered, the serverless management system determines an associated action to take to minimize regret. Additional detail regarding a regret threshold is provided below with respect to FIG. 4.

If the serverless management system 106 determines that adding a serverless execution container to the container pool triggers one or more regret thresholds (e.g., the serverless management system 106 regrets not having an added serverless execution container when processing the machine learning model data), in one or more implementations, the serverless management system 106 can determine to immediately increase the container pool by a serverless execution container. In some implementations, the serverless management system 106 iterates through most or all of the time instances within the given time period to determine whether not adding another serverless execution container would trigger the regret threshold.

In one or more implementations, the serverless management system 106 determines that removing a serverless execution container triggers one or more regret thresholds (e.g., the serverless management system 106 regrets not processing the machine learning model data with fewer serverless execution containers). In these implementations, the serverless management system 106 then determines to decrease the serverless execution container pool by a serverless execution container as soon as possible (e.g., immediately if a serverless execution container is idle or as soon as the next serverless execution container finish processing data). Similarly, the serverless management system 106 can iterate through most or all of the time instances to determine whether removing a serverless execution container would trigger the regret threshold.

As shown, the series of acts 300 includes an act 308 of modifying the pool of serverless execution containers. As mentioned above, upon determining whether adding or removing a serverless execution container from the container pool would meaningfully reduce computing latency or computing cost, in one or more implementations, the serverless management system 106 modifies the number of serverless execution containers in the container pool accordingly.

As described previously, in various implementations, the serverless management system 106 can iteratively test whether first adding, then removing (or vise-versa) serverless execution containers would trigger one or more regret thresholds (or not trigger depending on how the threshold is set up). For each iteration until a regret threshold is triggered (e.g., the serverless management system 106 regrets not modifying the container pool at that time instance), the serverless management system 106 can continue to the next iteration. Indeed, for that iteration, not adding or not removing a serverless execution container would cause the serverless management system 106 to regret its decision. Conversely, for the first detected iteration where the one or more regret thresholds are triggered (e.g., not modifying the container pool at that time instance would cause too much regret), the serverless management system 106 can implement the proposed adjustment and cease performing additional iterations.

In one or more implementations, the serverless management system 106 can repeat the process of optimizing the number of serverless execution containers for the now updated pool based on the additional/more recently received machine learning model data. Indeed, in various implementations, the serverless management system 106 starts the optimization process anew with more recent model data. Additional detail regarding the serverless execution container pool optimization process is provided below in connection with FIG. 5

As mentioned above, FIG. 4 illustrates determining whether computing latency or computing cost triggers a regret threshold in accordance with one or more implementations. As shown, FIG. 4 includes a graph 400 that includes changes in computing cost 402 and changes in computing latency 404 over time. In addition, the graph 400 includes a regret threshold 406.

For simplicity, the graph 400 in FIG. 4 provides a hypothetical example of how changes in computing cost 402 or computing latency 404 may exceed a regret threshold 406. Additionally, while the graph shows a single line for computing cost 402 and computing latency 404 correspond to a target time instance, in alternative implementations, the graph shows different computing cost changes and computing latency changes based on either adding or removing serverless execution containers and for each time instance across a given period of time. Further, while a single fixed regret threshold 406 is shown, in various implementations, the serverless management system 106 can measure the computing cost changes and the computing latency changes against multiple regret thresholds, which can vary in value over time.

As mentioned above, in some implementations, the serverless management system 106 measures regret as a computing cost increase due to provisioning more containers to keep warm (e.g., a serverless execution container provisioning cost). For example, in various implementations, the regret threshold 406 is a variable or fixed computing cost increase. For instance, the regret threshold 406 varies based on computing resources available on a cloud computing device, time of day, size or other attributes of the serverless execution container, etc. If adding a serverless execution container at a given time instance (e.g., to decrease computing latency) causes the change in computing cost for the time period (e.g., based on the arrival patterns of machine learning model data across the time period) to exceed the regret threshold 406 (e.g., raises expenses beyond an allocated budget and cause regret), then the serverless management system 106 determines not to add a serverless execution container to the container pool.

As also mentioned above, in one or more implementations, the serverless management system 106 measures regret as a computing latency increase due to reducing the number of containers (e.g., to decrease computing cost). For example, in one or more implementations, the regret threshold 406 is a fixed or variable computing latency increase (e.g., a maximum latency increase). For instance, the regret threshold 406 varies based on the priority of operations being performed on the serverless execution containers. If removing a serverless execution container from the container pool at a given time instance causes the computing latency for the time period to exceed the regret threshold 406 (e.g., delay processing the machine learning model data beyond a maximum latency time increase), then the serverless management system 106 determines not to remove a serverless execution container from the container pool.

In some implementations, the regret threshold 406 depends on a comparison between computing latency change and computing cost change. For example, the serverless management system 106 determines if the savings to computing latency by adding a serverless execution container outweighs the increase in computing cost, or vice-versa. To illustrate, in one or more implementations, the serverless management system 106 determines that the regret threshold 406 is triggered when the change in computing latency exceeds the change in computing cost (e.g., when a serverless execution container is added at a time instance within the time period). In other implementations, the serverless management system 106 determines that the regret threshold 406 is triggered, for an iteration, when the change in computing cost exceeds the change in computing latency (e.g., when a serverless execution container is removed at a time instance within the time period).

In some implementations, the serverless management system 106 can weight either the computing latency change and/or the computing cost change. For instance, adding weight to the computing cost change (or vise-versa) enables the serverless management system 106 to normalize and directly compare the two terms. Indeed, in one or more implementations, adding weight to one of the terms indicates to the serverless management system 106 indicates whether one term is prioritized over the other.

As mentioned above, FIG. 5 illustrates a state diagram of an algorithm for dynamically adjusting the capacity of a serverless execution container pool in accordance with one or more implementations. As shown, FIG. 5 includes a series of acts 500 for optimizing the size of a serverless execution container pool based on analyzing arrival patterns of machine learning model data over a given time period. In various implementations, the serverless management system 106 and/or the online learning model 108 implements the series of acts 500.

As shown, the series of acts 500 includes an act 502 of determining computing latency and computing cost for a current serverless execution container pool size. In various implementations, the act 502 includes the serverless management system 106 determining computing latency and computing cost for processing machine learning model data across a given time period based on the current or existing number of serverless execution containers in the container pool during the time period. Indeed, the serverless management system 106 can utilize the computing latency and the computing cost determined here as a baseline for further cost comparisons, as described below.

In one or more implementations, the serverless management system 106 determines the computing latency as a value of time. For example, the serverless management system 106 determines computing latency based on the arrival time of machine learning model data at each time instance, the time needed to process the machine learning model data, and the elapsed time between time instances (e.g., between each time instance and the last time instance).

To illustrate, in some implementations, the serverless management system 106 determines computing latency based on first determining an average processing time (e.g., $\tau$) for processing the machine learning model data across the time period given the current number of serverless execution containers. In addition, the serverless management system 106 determines a processing completion or end time (e.g., e) based on adding the average processing time (e.g., $\tau$) to the last time instance when model data arrives. Further, the serverless management system 106 determines time differences between the processing completion or end time (e.g., e) and each time instance when model data arrives. In these implementations, the serverless management system 106 determines the computing latency (e.g., l) as the sum of all of the time differences. For a more detailed explanation, Listing 1 below provides example algorithmic steps for determining computing latency (e.g., see the CALCLATCOST Function).

In some implementations, the serverless management system 106 determines computing cost based on the current number of serverless execution containers (e.g., parallel workers or functions) and provisioning cost. For example, the serverless management system 106 determines computing cost (e.g., c) by applying a serverless execution container provisioning cost to the number of serverless execution containers in the serverless execution container pool. For a more detailed explanation, Listing 1 below provides an example algorithmic step for determining computing cost (e.g., see the CALCLATCOST Function).

As mentioned above, new serverless execution containers often require provisioning from a cold state to a warmed state. In many implementations, this provisioning cost is calculated as computing latency (e.g., measured by time). In some implementations, a serverless execution container provisioning cost includes computing cost as well. For example, in these implementations, each added serverless execution container adds a provisioning cost of x amount of computing latency and/or y amount of computing cost. Indeed, serverless execution container provisioning costs often vary based on the specific cloud computing environment and resources available.

As shown, the series of acts 500 includes an act 504 of determining computing latency and computing cost for an increased pool size. As mentioned above, in one or more implementations, for each time instance within the time period (sometimes excluding the first time instance), the serverless management system 106 determines a new computing latency and computing cost based on adding in a predetermined and/or fixed number of serverless execution containers (e.g., γ) at the target time instance. For ease of explanation, while the disclosure refers to adding one additional serverless execution container, the predetermined number of serverless execution containers can be a different number of serverless execution containers (e.g., 2, 5, 10, etc.).

By way of illustration, the following example continues through the disclosure of FIG. 5. Suppose a given time period included a first, second, and third time instance where machine learning model data arrived and was processed. In one or more implementations, the serverless management system 106 determines a first new computing latency and computing cost based on adding a serverless execution container at the second time instance, which would provide additional processing capabilities at the second time instance and the third time instance. In one or more implementations, the first new computing latency and computing cost include processing the incoming machine learning model data arriving at the first time instance with the current number of serverless execution containers combined with processing the remainder of incoming machine learning model data with the support of the added serverless execution container.

In one or more implementations, the serverless management system 106 determines a computing latency change and a computing cost change for the first new computing latency and the first new computing cost. For example, in one or more implementations, the serverless management system 106 determines the difference between the first new computing latency and the current computing latency (e.g., a baseline computing latency) to determine a first computing latency change. Similarly, the serverless management system 106 determines the difference between the first new computing cost and the current computing cost (e.g., the baseline computing cost) to determine a first computing cost change. For a more detailed explanation, Listing 1 below provides example algorithmic steps for determining a computing latency change and a computing cost change based on adding one or more serverless execution containers to a serverless execution container pool (e.g., see the ADJUSTPOOLCAPACITY Function).

As shown in FIG. 5, the series of acts 500 includes an act 506 of determining whether a computing latency change exceeds a computing cost change. For example, in various implementations, the serverless management system 106 compares the computing latency change to the computing cost change to determine if adding a serverless execution container in the second time instance triggers a regret threshold. In particular, the serverless management system 106 determines if the change in computing latency reduction outweighs the computing cost.

In one or more implementations, as mentioned previously, the serverless management system 106 weights the computing cost change before comparing it with the computing latency change. In some implementations, the weight (e.g., w) is a hyperparameter for the online learning model 108 that indicates the relative importance of computing costs with respect to computing latency (or vice-versa). For example, the weight can indicate computing cost is half as important as computing latency (e.g., two units of computing cost reduction is equal to one unit of computing latency reduction). In various implementations, the weight can dynamically change based on resources available at the cloud computing device or model complexity of the machine-learning models on the serverless execution containers.

Returning to the above example, in some implementations, the serverless management system 106 determines that the computing latency change exceeds the computing cost change (or weighted computing cost change) based on adding an additional serverless execution container to the container pool at the second time instance. In these implementations, the serverless management system 106 then increases the container pool size of the serverless execution containers, as shown in act 508 of the series of acts 500. Indeed, the serverless management system 106 adds a serverless execution container (or the predetermined number of serverless execution containers (e.g., γ)) to the serverless execution container pool when the regret threshold is triggered (e.g., the serverless management system 106 regrets not adding the one or more serverless execution containers at the time instance).

Otherwise, if the serverless management system 106 determines that the computing latency change does not exceed the computing cost change (or a weighted computing cost change), the serverless management system 106 can determine whether removing a serverless execution container from the container pool triggers a regret threshold. Indeed, the serverless management system 106 can determine whether removing a serverless execution container at different time instances within the given time period would significantly reduce computing cost without increasing computing latency beyond a maximum latency increase limit (i.e., a regret threshold).

To illustrate, as shown, the series of acts 500 includes an act 510 of determining computing latency and computing cost for a decreased pool size. Continuing the above example, the serverless management system 106 determines a second new computing latency and computing cost based on removing a serverless execution container (or the predetermined number of serverless execution containers) at the second time instance, which would reduce capabilities for processing the incoming machine learning model data arriving at the second time instance and the third time instance. In particular, the second new computing latency and computing cost include processing the incoming machine learning model data arriving at the first time instance with the current number of serverless execution containers combined with processing the remainder of incoming machine learning model data with one less serverless execution container.

In one or more implementations, the serverless management system 106 determines a computing latency change and a computing cost change for the second new computing latency and/or the second new computing cost. For example, in one or more implementations, the serverless management system 106 determines the difference between the second new computing latency and the current computing latency (e.g., the baseline computing latency) to determine a second computing latency change.

As shown in FIG. 5, the series of acts 500 includes an act 512 of determining whether a computing latency change exceeds a maximum latency increase limit. For example, the serverless management system 106 determines whether the second computing latency change increases computing latency beyond the maximum latency increase limit (e.g., a regret threshold) based on removing a serverless execution container from the container pool at the second time instance. In alternative implementations, the act 512 can include determining whether the second computing latency change is less than a second computing cost change (e.g., whether the computing cost savings of removing a serverless execution container causes latency to increase over an acceptable limit). For a more detailed explanation, Listing 1 below provides example algorithmic steps for determining a computing latency change and a computing cost change based on removing one or more serverless execution containers to a serverless execution container pool (e.g., see the ADJUSTPOOLCAPACITY Function).

As shown in FIG. 5, if the computing latency change does not exceed the maximum latency increase limit, the serverless management system 106 decreases the pool size of serverless execution containers, as shown in an act 514 of the series of acts 500. Indeed, if removing a serverless execution container at the second time instance improves overall computing latency for the given time period, or at least only increases computing latency within an acceptable range (e.g., below the maximum latency increase limit), then the serverless management system 106 removes a serverless execution container (or the predetermined number of serverless execution containers).

Conversely, in one or more implementations, if the second computing latency change exceeds the maximum latency increase limit, the serverless management system 106 determines to keep the serverless execution container pool the same size. To illustrate, the series of acts 500 includes an act 516 of maintaining the same pool size of serverless execution containers. Here, the serverless management system 106 determines that neither adding nor removing a serverless execution container to the serverless execution container pool at the second time instance provides enough of an advantage, or cost savings, to take action.

In one or more implementations, upon determining to maintain the same number of serverless execution containers in the pool, the serverless management system 106 repeats the acts 504-516 at a different time instance. For example, the serverless management system 106 repeats the one or more of acts 504-516 by determining whether to add or remove a serverless execution container at a third time instance. If the serverless management system 106 determines to increase the container pool size (e.g., the act 508) or decrease the container pool size (e.g., the act 514), the serverless management system 106 can advance to the act 518 (described below). Otherwise, the serverless management system 106 can iterate to the next time instance (shown as the dashed box in FIG. 5) until all time instances have been tested.

As mentioned above, in one or more implementations, FIG. 5 shows repeating the acts 504-516 in the order shown for each time instance. In alternative implementations, the serverless management system 106 first iterates through the acts 504-506 for each time instance until either the act 508 is reached (i.e., increase the container pool size) or each iteration advances to the act 510. Then, if the act 508 is not reached, the serverless management system 106 iterates through the acts 510-512 for each time instance. Indeed, the serverless management system 106 can iterate through the acts 504-516 following multiple paths.

As mentioned above, the series of acts 500 includes an act 518 of providing additional machine learning model data to the pool of serverless execution containers for processing. For example, the serverless management system 106 identifies fresh machine-learning model data and provides the fresh model data to the modified pool of warmed serverless execution containers to process the machine learning model data, as described above.

In addition, in various implementations, the serverless management system 106 can repeat the series of acts 500 for a future time instance based on the newly arrived machine learning model data. Indeed, in one or more implementations, the serverless management system 106 utilizes the online learning model 108 to continuously modify the number of serverless execution containers in the container pool overtime to continually optimize for anticipated incoming machine learning model data.

Further, while the series of acts illustrates a particular order of acts, the serverless management system 106 can perform one or more of the acts in different orders. For example, the serverless management system 106 performs acts 504-508 for each time instance before advancing to the act 510. In another example, the serverless management system 106 performs the acts 510-516 before the acts 504-508. Moreover, the serverless management system 106 can perform additional or fewer acts than shown in the series of acts 500.

As mentioned above, Listing 1 includes algorithmic steps of an implementation of the online learning model 108 for determining computing latency, computing cost, computing latency change, and computing cost change based on increasing or decreasing the number of serverless execution containers in a container pool at different times instances within a given period of time. Indeed, Listing 1 includes algorithms for computing latency and computing cost-aware serverless execution container optimization based on arrival patterns of incoming machine learning model data across the time period.

---

Listing 1

Function COLDSTART (numworkers):
  return δ *f(numworkers);
Function CALCLACOST (i, j, p):

$$\tau \leftarrow \frac{\alpha(sum(\text{data}[i \ldots j])) + \beta}{p}$$

e ← τ + Arrival[j]
  c ← p × Δ
  l ← $\Sigma_{k=i}^{j}$ e − Arrival[k]
  return l, c,
Function ADJUSTPOOLCAPACITY (i, j, $p_{curr}$):
  $l_{curr}$, $c_{curr}$ ← CALCLACOST(i, j, $p_{curr}$)
  for all t ∈ {i + 1, . . . , j − 1} do
    $l_1$, $c_1$ ← SUM(CALCLACOST(i, j, $p_{curr}$) + CALCLACOST(t + 1, j, $p_{curr}$ + γ))
    if (($l_{curr}$ − $l_1$) > w × ($c_1$ − $c_{curr}$)) then
      return TRUE, INCREASE,
    end
  end
  for all t ∈ {i + 1, . . . , j − 1} do
    $l_2$, $c_2$ ← SUM(CALCLACOST(i, j, $p_{curr}$) + CALCLACOST(t + 1, j, $p_{curr}$ − γ))
    if (($l_{curr}$ − $l_2$) < max-latency-increase) then -continued Listing 1

```
    return TRUE, DECREASE;
  end
end
return FALSE, NO-OPERATION;
```

As shown, Listing 1 includes the online learning model parameters $\alpha$, $\beta$, $\gamma$, and $\delta$. In one or more implementations, $\alpha$ represents a processing time weight, $\beta$ represents a processing time constant, $\gamma$ represents a predetermined or fixed number of serverless execution containers (e.g., parallel workers or functions) to add or remove at a target time instance, and/or $\delta$ represents a serverless execution container provisioning cost. In various implementations, the serverless management system 106 learns the online learning model parameters $\alpha$, $\beta$, $\gamma$, and $\delta$ through training the online learning model 108. Additionally, as shown, Arrival [1, 2, . . . n] refers to the arrival time of untrained machine learning model data. Further, p refers to the current number of serverless execution containers (e.g., parallel workers) in the container pool.

In some implementations, w represents a weight if a regret function (e.g., a minimization objective). For example, w corresponds to the computing weight applied to the computing cost changed described above. In some implementations, w is learned through training the online learning model 108 (e.g., based on a minimization objective function), as mentioned above.

As shown, Listing 1 includes various functions. In one or more implementations, the COLDSTART function returns the time needed to provision the number of containers in the serverless execution container pool and train an online machine-learning model based on machine learning model data. In some implementations, the CALCLATCOST Function determines a computing latency and computing cost given a first time instance, the last time instance, and the number of containers in a container pool. As shown, the CALCLATCOST Function includes the average processing time (e.g., $\tau$), the processing end time (e.g., e), the computing latency (e.g., l), and the computing cost (e.g., c) described above.

Additionally, Listing 1 includes the ADJUSTPOOLCAPACITY Function. As shown, the ADJUSTPOOLCAPACITY Function includes four sections. In the first section, the online learning model 108 generates the current computing latency (e.g., $l_{curr}$) and computing cost (e.g., $c_{curr}$), which is described above.

In the second section, the online learning model 108 determines a new first computing latency (e.g., $l_1$) and a new first computing cost based on adding one or more serverless execution containers at different target time instances. For instance, for each target time instance (e.g., t), the online learning model 108 determines the new first computing latency and the new first computing cost by calling the CALCLATCOST Function from the first time instance to the target time instance given the current number of serverless execution containers in the container pool. Next, the online learning model 108 calls the CALCLATCOST Function from the next time instance after the target time instance to the last time instance given one or more additional serverless execution containers in the container pool. The online learning model 108 combines the retuned values from these two function calls to generate the new first computing latency and the new first computing cost.

In addition, the second section includes determining if the regret threshold is triggered (e.g., exceeded). To illustrate, Listing 1 shows the online learning model 108 comparing a first computing latency change (e.g., $l_{curr}-l_1$) to a weighted first computing cost change (e.g., $w \times (c_{curr}-c_1)$) to determine if adding one or more serverless execution containers at the target time instance reduces computing latency more than a weighted computing cost savings. If so, the online learning model 108 increments the serverless execution container pool by the one or more serverless execution containers (e.g., shown as "INCREASE" in Listing 1).

The third section is similar to the second section in that the online learning model 108 iterates through each time instance to determine a new computing latency change (e.g., $l_2$) and/or a new computing cost change (e.g., $c_2$). As shown, the online learning model 108 determines, for each target time instance, a new second computing latency and a new second computing cost based on removing one or more serverless execution containers at the target time instance, as previously described. In addition, the online learning model 108 determines whether the second computing latency change (e.g., $l_{curr}-l_2$) is less than a maximum latency increase limit. Stated differently, the online learning model 108 determines whether removing one or more serverless execution containers at the target time instance increases computing latency beyond a maximum latency limit. If the change in computing latency is within the limit, the online learning model 108 removes the one or more serverless execution containers from the serverless execution container pool (e.g., shown as "DECREASE" in Listing 1).

The fourth section is a default section. If the online learning model 108 runs through each target time instance and determines that 1) adding a serverless execution container to the container pool at the target time instance does not result in significant computing latency savings and 2) removing a serverless execution container from the container pool at the target time instance would cause too much additional computing latency, then the online learning model 108 determines to maintain the number of serverless execution containers in the serverless execution container pool (e.g., shown as "NO-OPERATION" in Listing 1).

In one or more implementations, the serverless management system 106 adds constraints to the online learning model 108. For example, if the online machine-learning model requires specific implementation approaches or requirements (e.g., data or memory requirements), the serverless management system 106 adds constraints to the online learning model 108 to accommodate these needs. Indeed, a particular online machine-learning model may cause the serverless management system 106 to tailor the online learning model 108 to its requirements.

As another example, a particular online machine-learning model (e.g., online learning application) includes certain scaling characteristics (e.g., in terms of memory and computing resources). To illustrate, online learning applications that execute topic modeling and matrix factorization have different scaling behaviors based on the number of topics modeled and the number of incoming users, respectively. Accordingly, in one or more implementations, the serverless management system 106 designs a more sophisticated online learning model 108 that decides how to scare out the resources of the online learning application.

Additionally, FIG. 5 and the identified corresponding text describe various implementations of dynamically adjusting a plurality of serverless execution containers. Accordingly, the actions and algorithms described in connection with at least FIG. 5, as well as the other figures referred to therein, provide example structure, architecture, and actions for performing a step for determining a second number of serverless execution containers in the pool of serverless execution containers that maximizes computing latency reduction. Indeed, the state diagram described in connection with FIG. 5 along with Listing 1 provide structure and actions for one or more of the algorithms corresponding to the serverless computing management system and/or online learning model for determining when to modify a serverless execution container pool to reduce computing latency.

While the online learning model 108 is described in one or more algorithms, such as the algorithm included in Listing 1, in various implementations, the online learning model 108 is implemented as another type of learning model. For example, in various implementations, the online learning model 108 includes a neural network, a decision tree, a bandit-based model, a logical regression model, or a support vector machine. For instance, the online learning model 108 is a deep learning neural network that receives machine learning model data (and/or historical computing latency and historical computing costs) as input and outputs a number of serverless execution containers needed to process the model data. In alternative implementations, the online learning model 108 is a logical regression model that utilizes a support vector machine to determine when and how to modify the number of serverless execution containers in a container pool based on arrival patterns of machine learning model data.

As mentioned above, FIGS. 6A-7 corresponds to the continuous training of online machine-learning models on serverless execution containers. To illustrate, FIGS. 6A-6B show a sequence diagram of a series of acts 600 for continuously training online machine-learning models on serverless execution containers in accordance with one or more implementations. As shown, FIGS. 6A-6B includes the server device 102 having the serverless computing management system 106, the online learning model 108, and the shared storage 110. FIGS. 6A-6B also includes the cloud computing device 112 having the serverless execution containers 114.

In one or more implementations, the serverless execution containers include one or more online machine-learning models. Indeed, each time the cloud computing device 112 creates a new serverless execution container, it loads an initial version of an online machine-learning model. As described above, most cloud computing devices and/or cloud computing systems support only stateless operations and applications. However, online machine-learning models often need continuous retraining as new data streams (e.g., machine learning model data) are identified. Accordingly, the serverless management system 106 extends support for online training to machine-learning models implemented on serverless execution containers.

To illustrate, the series of acts 600 in FIG. 6A includes an act 602 of the serverless management system 106 (i.e., the serverless computing management system 106) providing machine learning model data and parameters to the first number of serverless execution containers 114. In one or more implementations, the machine-learning model data (or simply "model data") includes software and/or packages for implementing an online machine-learning model on a new serverless execution container (e.g., a function on the serverless execution container is ready to execute). For example, the cloud computing device 112 utilizes the machine learning model data to load the online machine-learning model on the new serverless execution container.

In some implementations, the model data includes training data. As described above, an online machine-learning model utilizes model training data to further train to improve accuracy in generating prediction or making decisions. For example, if the online machine-learning model corresponds to personalized recommendation for a user, as the user develops new preferences, the online machine-learning model can retain to generate recommendations based on the latest preferences. Also, as described above, the serverless management system 106 provides model parameters (i.e., "machine learning model parameters") to the serverless execution containers 114. As mentioned previously, in one or more implementations, model parameters include values and weights for an online machine-learning model learned in a previous training iteration.

As shown, the series of acts 600 includes an act 604 of the serverless execution containers 114 utilizing machine-learning models on the first number of serverless execution containers to generate modified model parameters. For example, the online machine-learning model on the serverless execution container 114 applies the model parameters and processes the training model data to generate modified model parameters. In particular, the online machine-learning models learn new values and weights that result in more accurate model predictions. An example of training a machine-learning model is described further below in connection with FIG. 7.

As shown in FIG. 6A, the series of acts 600 includes an act 606 of the serverless execution containers 114 providing the modified model parameters to the serverless management system 106. Indeed, because serverless execution containers are largely stateless, any progress achieved through training is traditionally lost when the serverless execution container is shut down. Further, new serverless execution containers include the initially trained online machine-learning models. Accordingly, the serverless execution containers 114 provide the modified model parameters learned through training to the serverless management system 106.

As shown, the series of acts 600 includes an optional act 608 of the serverless management system 106 combining modified model parameters. For example, in one or more implementations, the serverless management system 106 provides different model training data to different instances of online machine-learning models. In some cases, the training overlaps in time. Additionally, the different instances of online machine-learning models each provide a set of modified model parameters back to the serverless management system 106 that improve the accuracy of the online machine-learning model. Accordingly, the serverless management system 106 combines the modified model parameters together. In some implementations, the serverless management system 106 combines a set of modified model parameters with pre-modified model parameters. In some implementations, the serverless management system 106 weights each set of model parameters (e.g., based on freshness or time received) before generating a combined set of model parameters.

As shown in FIG. 6B, the series of acts 600 includes an act 610 of the serverless management system 106 storing the modified model parameters (or combined model parameters) at the shared storage 110. As illustrated, the shared storage 110 is located on the server device 102. In alternative implementations, the shared storage 110 is located on the cloud computing device 112. In some implementations, the shared storage 110 is on a computing device apart from both the server device 102 and the cloud computing device 112.

Further, while the act 610 shows the serverless management system 106 storing the modified model parameters on the shared storage 110, in some implementations, the serverless execution containers 114 directly access and store the modified model parameters on the shared storage 110. Indeed, in one or more implementations, when the act 608 is omitted, the serverless execution containers directly access the shared storage 110 to store and retrieve model data and model parameters.

As shown, the series of acts 600 includes an act 612 of the serverless management system 106 determining an updated second number of serverless execution containers. For example, as described above, the serverless management system 106 utilizes an online learning model 108 to determine to increase or decrease the number of serverless execution containers in a serverless execution container pool. In some implementations, the second number determined by the serverless management system 106 matches the first number of serverless execution container.

As also shown in FIG. 6B, the series of acts 600 includes an act 614 of the serverless execution containers 114 adjusting the serverless execution containers to match the second number of serverless execution containers. For example, the serverless management system 106 provides a message or indication to the cloud computing device to add (or remove) a serverless execution container to the serverless execution container pool. In response, the cloud computing device provisions (or removes) a serverless execution container with the online machine-learning model. In this manner, when the serverless management system 106 needs to utilize the additional serverless execution container to reduce computing latency, it will be warm and ready to use, but without significantly increasing computing costs of maintaining idle serverless execution containers for long periods of time.

Further, as shown in FIG. 6, the series of acts 600 includes an act 616 of the serverless management system 106 identifying additional machine learning model data. For example, the serverless management system 106 detects and/or receives additional machine learning model data (e.g., incoming traffic) as additional training information is generated corresponding to the online machine-learning models.

As shown, the series of acts 600 includes an act 618 of the serverless management system 106 receiving the modified model parameters from the shared storage 110. In one or more implementations, the act 618 includes the serverless management system 106 accessing and retrieving the modified model parameters from the shared storage 110, as previously disclosed.

Moreover, the series of acts 600 includes an act 620 of the serverless management system 106 providing the additional machine learning model data and modified model parameters to the second number of serverless execution containers 114. For example, the serverless execution containers 114 overcome their stateless limitation by applying the modified model parameters to the online machine-learning model (including and newly added online machine-learning model) to restore the online machine-learning models to their last (or a previous) trained state. As mentioned above, in one or more implementations, the serverless execution containers 114 can directly access the modified model parameters.

Further, in their last trained state, the online machine-learning model can process the additional model training data (i.e., modified model parameters) to further train the online machine-learning models. In alternative implementations, the up-to-date online machine-learning models can process incoming model data to generate and return model predictions to client devices associated with users. In this manner, the online machine-learning models can apply new incoming model data on top of intermediate models instead of starting from scratch.

Figure 7:
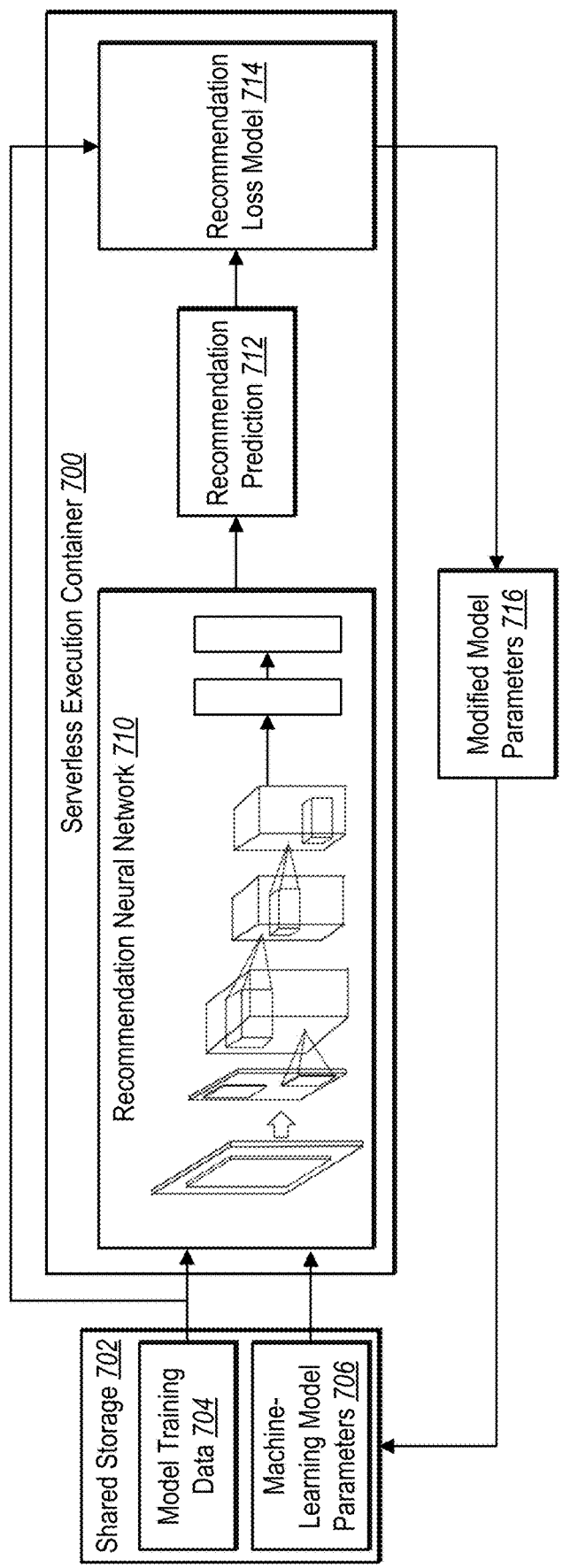
FIG. 7 illustrates a block diagram of training an online machine-learning model within a serverless execution container in accordance with one or more implementations.

Turning now to FIG. 7, additional detail is provided regarding training an online machine-learning model. To illustrate, FIG. 7 shows a block diagram of training an online machine-learning model within a serverless execution container in accordance with one or more implementations. As mentioned above, online machine-learning models can include neural networks, linear regression models, logistical regression models, random forest models, support vector machines (SVG) models, decision tree models, bandit-based models or other types of learning models. For ease of explanation, FIG. 7 describes training a recommendation neural network as an online machine-learning model.

As shown, FIG. 7 includes a serverless execution container 700 that implements a recommendation neural network 710. In some implementations, the recommendation neural network 710 is a convolutional neural network. In alternative implementations, the recommendation neural network 710 is another type of deep learning neural network (e.g., a long-term short memory, or LSTM, neural network).

In various implementations, the recommendation neural network 710 includes several neural network layers. For example, in one or more implementations, the recommendation neural network 710 includes lower neural network layers that encode input data into latent recommendation feature vectors and higher neural network layers that generate recommendation predictions from the latent recommendation feature vectors (e.g., using a SoftMax classifier).

As mentioned previously, the serverless execution container 700 can initialize the recommendation neural network 710 with a set of default or random model parameters. Then, the serverless management system 106 can provide, or the serverless execution container 700 can access more recent machine-learning model parameters 706 (or simply "model parameters 706") from the shared storage 702. As described above, the serverless execution container 700 can update the recommendation neural network 710 with the model parameters 706 to restore the recommendation neural network 710 to a more recent state.

As shown, the recommendation neural network 710 utilizes model training data 704 from the shared storage 702 (or another location) to accurately generate a recommendation prediction 712. In particular, the model training data 704 generally includes training input data and corresponding ground truth data. For example, the input data corresponds to actions of a user with respect to a plurality of content items and the ground truth data corresponds to a content item selected by the user.

In various embodiments, the serverless management system 106 (e.g., directly or via the serverless execution container 700) trains the recommendation neural network 710 by providing the model training data 704 to the recommendation neural network 710. The recommendation neural network 710 encodes the model training data to generate latent feature vectors. In addition, the recommendation neural network 710 begins to classify the latent feature vectors to generate recommendation predictions 712.

In one or more implementations, during training, the recommendation neural network 710 provides the recommendation predictions 712 to a recommendation loss model 714. In various embodiments, the recommendation loss model 714 compares the recommendation predictions 712 generated by the recommendation neural network 710 based on target model training data to a corresponding target ground truth (e.g., an actual user selection) to determine an amount of recommendation error loss (or simply "recommendation loss").

Further, in one or more implementations, the serverless management system 106 utilizes the recommendation loss to train and optimize the neural network layers of the recommendation neural network 710 via backpropagation and/or end-to-end learning. For example, the serverless management system 106 back propagates the recommendation loss to tune the neural network layers of the recommendation neural network 710. In this manner, the serverless management system 106 can iteratively tune and train the recommendation neural network 710 to learn a set of best-fit parameters (i.e., the modified model parameters 716) that predict accurate recommendations.

As shown, once trained with modified model parameters 716, the recommendation neural network 710 provides the modified model parameters 716 to the shared storage 702, as previously described. The serverless management system 106 then utilizes the modified model parameters 716 to further train the recommendation neural network 710 on another serverless execution container in the client device utilizing additional model training data to generate further modified model parameters. In this manner, the serverless management system 106 continuously trains the recommendation neural networks via the container pool.

In one or more implementations, the serverless management system 106 can transform a recommendation neural network into a trained network utilizing the modified model parameters 716. For instance, the serverless management system 106 sends the modified model parameters 716 to a client device associated with a user that includes a recommendation neural network. Using the trained recommendation neural network, the client device then locally performs personal recommendations to the user. Indeed, while the client device is generally unable to train a recommendation neural network because of hardware constraints, it can easily implement, execute, and store a much smaller pre-trained recommendation neural network.

As mentioned above, the serverless management system 106 empirically outperforms conventional systems. To test the performance of the serverless management system 106, researchers simulated incoming data loads, utilizing a pricing dataset, to compare the online learning model 108 against conventional systems that utilize virtual machines and conventional systems that utilize vanilla serverless frameworks. Table 1 below shows the results of these evaluations.

TABLE 1

| Metric | VM-Based | Vanilla Serverless | Fixed Pool | Dynamic Pool Size |
|---|---|---|---|---|
| Computing Cost | 1.7 | 0.62 | 1.2 | 0.09 |
| Computing Latency (Seconds) | 3600 | 6185 | 3824 | 2931 |

As shown in Table 1, the dynamic pool size model corresponding to the online learning model 108 disclosed herein outperformed the other conventional systems in both computing latency and computing cost reduction. Indeed, as shown, with respect to conventional systems that utilize virtual machines, implementations of the serverless management system 106 perform 1.2 times faster and 18 times more cost efficient with respect to computing cost. Likewise, with respect to conventional systems that vanilla serverless frameworks, implementations of the serverless management system 106 perform 2.1 times faster and 7 times more cost efficient with respect to computing cost.

As mentioned above, in one or more implementations, regret is based on both computing latency and computing cost. In these implementations, a lower computing latency and computing cost result in a lower regret. To illustrate, FIG. 8 shows a graph 800 showing improvements by the online learning model in accordance with one or more implementations over baseline and alternative approaches. Indeed, the graph in FIG. 8 shows a regret comparison between some of the approaches tested above.

As shown, the graph 800 shows an amount of regret (y-axis) over time (x-axis). Further, the graph 800 shows regret comparisons for different pool size adjustment models. For example, the graph 800 shows regret comparisons between a fixed pool size model, a model with no pool size, and a dynamic pool size model. In particular, the fixed pool size model maintains the same pool size over time, the no pool model utilizes a vanilla serverless framework directly, and the dynamic pool size model corresponds to the online learning model 108 disclosed herein.

As shown, the no pool model produced the most negative effects indicated by the highest amount of regret over time. The fixed pool size model produced a lower regret than the no pool model, but a higher amount of regret than the dynamic pool size model. Indeed, the dynamic pool size model that corresponds to the online learning model 108 disclosed herein outperformed the other conventional systems.

Figure 9:
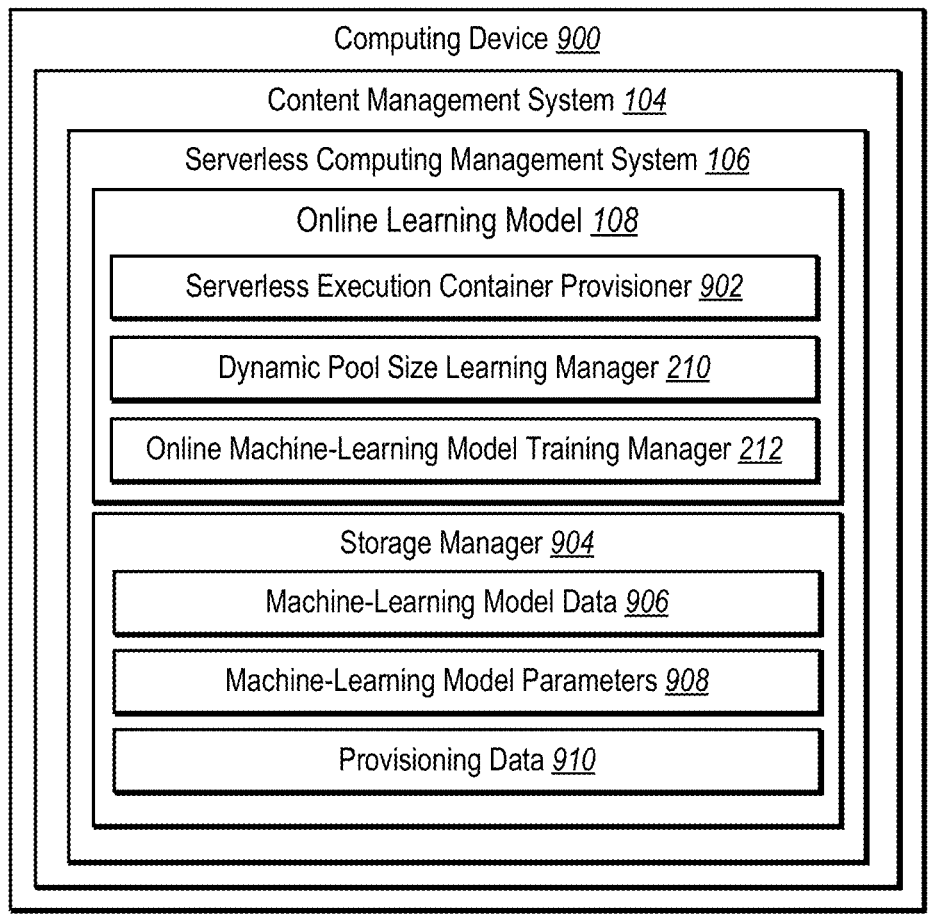
FIG. 9 illustrates a schematic diagram of the serverless computing management system in accordance with one or more implementations.

Referring now to FIG. 9, additional detail is provided regarding the capabilities and components of a serverless computing management system 106 in accordance with one or more implementations. In particular, FIG. 9 shows a schematic diagram of an example architecture of the serverless computing management system 106 (or simply "serverless management system 106") implemented within a content management system 104 and hosted on a computing device 900.

In addition, the computing device 900 may represent various types of computing devices. For example, in some implementations, the computing device 900 is a non-mobile computing device, such as a server, a cluster of servers, a desktop, or another type of non-mobile computing device. In one or more implementations, the computing device 900 is a mobile computing device, such as a laptop, a tablet, a mobile telephone, a smartphone, a wearable device, or a device connected to the internet. Additional details with regard to the computing device 900 are discussed below with respect to FIG. 11.

As shown, the computing device 900 includes the content management system 104, which is described above, and the serverless computing management system 106. The serverless computing management system 106 includes various components for performing the processes and features described herein. To illustrate, the serverless computing management system 106 includes the online learning model 108 having a serverless execution container provisioner 902, a dynamic pool size learning manager 210, and an online machine-learning model training manager 212. Further, the serverless computing management system includes a storage manager 904 (e.g., a shared storage) that includes machine learning model data 906, machine learning model parameters 908, and provisioning data 910.

As mentioned above, the serverless management system 106 includes the online learning model 108. As disclosed previously, in various implementations, the online learning model 108 learns to determine whether to increase, decrease, or maintain the number of serverless execution containers 114 in a serverless execution container pool of warm containers based on multiple factors and conditions. For example, in various implementations, the online learning model 108 utilizes arrival patterns of machine learning model data, computing latency, and computing cost across a time period to determine how to optimize the number of serverless execution containers 114 in a serverless execution container pool.

As shown, the online learning model 108 includes the serverless execution container provisioner 902. In one or more implementations, the serverless execution container provisioner 902 facilitates initializing new serverless execution containers. For example, the serverless execution container provisioner 902 provides the provisioning data 910 to a cloud computing device for provisioning new serverless execution containers. In some implementations, the provisioning data 910 includes software and/or packages corresponding to one or more online machine-learning models. Further, in some implementations, the serverless execution container provisioner 902 provides machine-learning model parameters 908 to a serverless execution container to be applied to one or more online machine-learning models, as described above.

As shown, the online learning model 108 includes the dynamic pool size learning manager 210. As described above, the dynamic pool size learning manager 210 determines an optimal number of serverless execution containers to keep warm in the serverless execution container pool. For example, in some implementations, the dynamic pool size learning manager 210 utilizes a machine-learning algorithm (e.g., see Listing 1) or another machine-learning model to determine how and when to increase, decrease, or maintain the number of warm serverless execution containers in the pool. In various implementations, the dynamic pool size learning manager 210 utilizes the machine learning model data 906 (e.g., arrival patterns of the model data) to determine an optimal serverless execution container pool size, as described above.

As shown, the online learning model 108 includes the online machine-learning model training manager 212. As described above, the online model training manager 212 facilitates training online machine-learning models located on the serverless execution containers within the pool. More particularly, the online model training manager 212 enables continuous and incremental training of online machine-learning models, even though serverless execution containers do not natively support online machine-learning training, and even when training a machine-learning model occurs across different serverless execution containers.

In various implementations, the online machine-learning model training manager 212 utilizes the machine learning model data 906 to train an online machine-learning model on a serverless execution container. Further, in various implementations, the online machine-learning model training manager 212 provides machine learning model parameters 908 to an online machine-learning model for processing and receives updated machine learning model parameters 908, as described above.

As shown, the serverless management system 106 includes storage manager 904. As mentioned, the storage manager 904 includes the machine learning model data 906, the machine learning model parameters 908, and the provisioning data 910. In various implementations, the storage manager 904 represents a shared storage, such as one or more instances of the shared storage medium disclosed above.

Each of the components of the serverless management system 106 can include software, hardware, or both. For example, the components can include one or more instructions stored on a computer-readable storage medium and executable by processors of one or more computing devices, such as a client device (e.g., a mobile client device) or server device. When executed by the one or more processors, the computer-executable instructions of the serverless management system 106 can cause a computing device to perform the feature learning methods described herein. Alternatively, the components can include hardware, such as a special-purpose processing device to perform a certain function or group of functions. In addition, the components of the serverless management system 106 can include a combination of computer-executable instructions and hardware.

Furthermore, the components of the serverless management system 106 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE EXPERIENCE, ADOBE CREATIVE CLOUD, ADOBE DOCUMENT CLOUD, or other digital content applications software packages. The foregoing are either registered trademarks or trademarks of Adobe Inc. in the United States and/or other countries.

FIGS. 1-9, the corresponding text, and the examples provide a number of different methods, systems, devices, and non-transitory computer-readable media of the serverless management system 106. In addition to the foregoing, one or more implementations can also be described in terms of flowcharts comprising acts for accomplishing a particular result, such as the flowcharts of acts shown in FIG. 10. Additionally, the acts described herein may be repeated or performed in parallel with one another or parallel with different instances of the same or similar acts.

Figure 10:
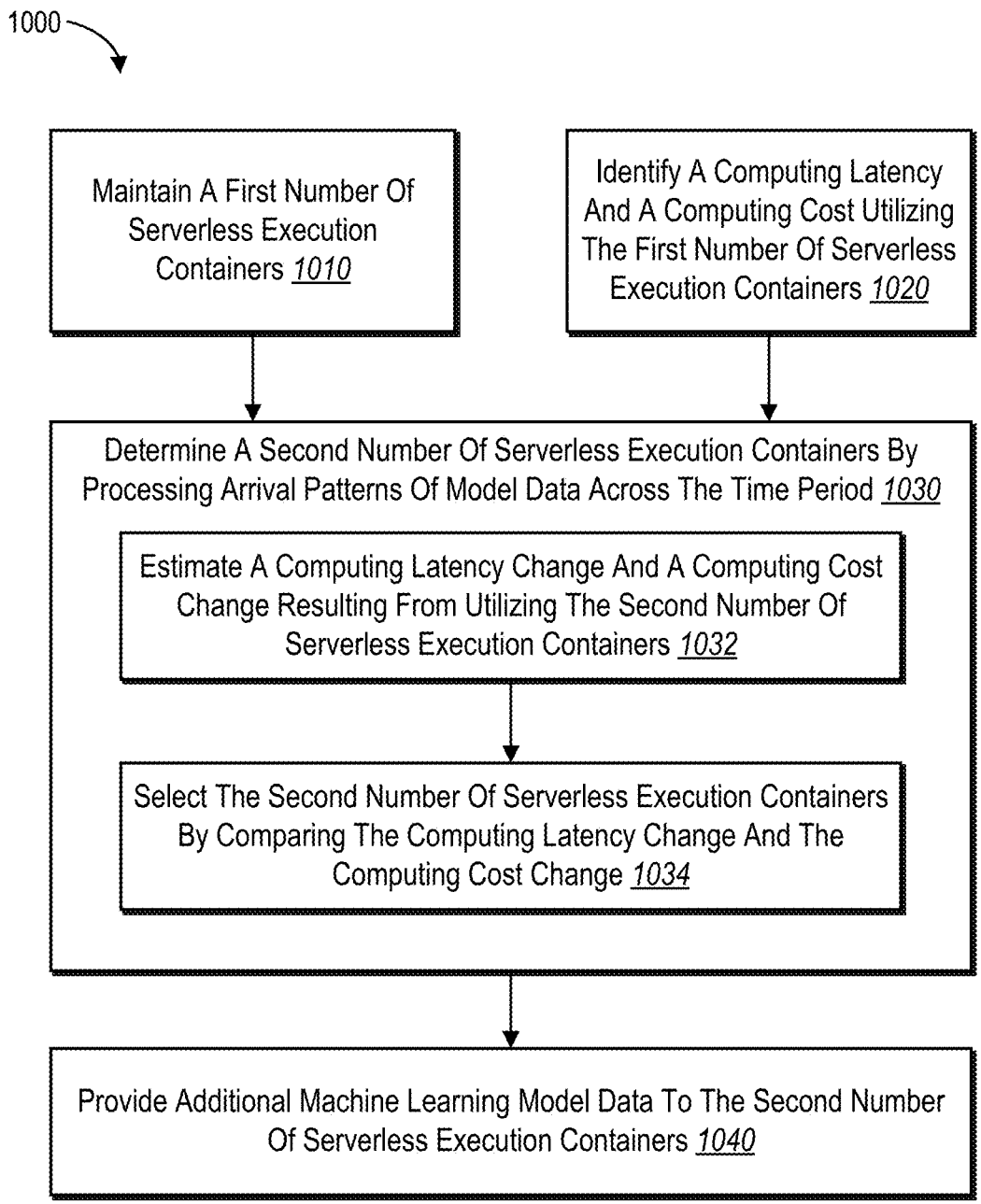
FIG. 10 illustrates a flowchart of a series of acts of dynamically adjusting a pool of serverless execution containers in accordance with one or more implementations.

As mentioned previously, FIG. 10 illustrates a flowchart of a series of acts 1000 of dynamically adjusting a plurality of serverless execution containers in accordance with one or more implementations. While FIG. 10 illustrates acts according to one implementation, alternative implementations may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some implementations, a system can perform the acts of FIG. 10.

In one or more implementations, the series of acts 1000 is implemented on one or more computing devices, such as the server device 102, the cloud computing device 112, the client device 116, or the computing device 900. In addition, in some implementations, the series of acts 1000 is implemented in a digital medium environment for continuously updating online machine-learning models. For example, the series of acts 1000 is implemented on a computing device having memory that includes machine learning model data and an online learning model for dynamically sizing a pool of serverless execution containers.

The series of acts 1000 can include an act 1010 of maintaining a first number of serverless execution containers. In some implementations, the act 1010 can involve communicating with a cloud computing device and/or a cloud computing system to allocate a pool of serverless execution containers that includes the first number of serverless execution containers. In some implementations, the act 1010 can include provisioning, loading, and/or initializing (e.g., warming) one or more online machine-learning models on the serverless execution containers within the serverless execution container pool.

As shown, the series of acts 1000 also includes an act 1020 of identifying a computing latency and a computing cost utilizing the first number of serverless execution containers. In particular, the act 1020 can involve identifying a computing latency and a computing cost of processing machine learning model data utilizing a first number of serverless execution containers from a pool of serverless execution containers over a time period. In some implementations, the act 1020 includes determining the computing cost of processing the machine learning model data utilizing the first number of serverless execution containers by applying a serverless execution container provisioning cost to the first number of serverless execution containers.

As shown, the series of acts 1000 also includes an act 1030 of determining a second number of serverless execution containers by processing arrival patterns of model data across the time period. In particular, the act 1030 can involve utilizing an online learning model to determine a second number of serverless execution containers by processing arrival patterns of the machine learning model data across the time period, the computing latency, and the computing cost.

As shown, the act 1030 can include various sub-acts. For example, the act 1030 includes a sub-act 1032 of estimating a computing latency change and a computing cost change resulting from utilizing the second number of serverless execution containers. In particular, the sub-act 1032 can include estimating a computing latency change and a computing cost change resulting from utilizing the second number of serverless execution containers to process arrival patterns of the machine learning model data.

As shown, the act 1030 includes a sub-act 1034 of selecting the second number of serverless execution containers by comparing the computing latency change and the computing cost change. For example, in one or more implementations, the sub-act 1034 can include weighting the computing cost change before comparing the computing latency change and the computing cost change.

In some implementations, the sub-act 1034 includes determining that changing a number of serverless execution containers from the first number of serverless execution containers to the second number of serverless execution containers is within a regret threshold for a current time instance. In one or more implementations, the sub-act 1034 includes weighting the computing cost change by a parameter indicating a prioritization of computing cost to computing latency. In these implementations, selecting the second number of serverless execution containers can be based on comparing the computing latency change to the weighted computing cost change.

In various implementations, the sub-act 1034 includes determining that the second number of serverless execution containers is within the regret threshold by determining a computing latency change resulting from utilizing the second number of serverless execution containers to process the arrival patterns of the machine learning model data across the time period and comparing the computing latency change to a maximum latency increase threshold.

In one or more implementations, the sub-act 1034 includes adding one or more serverless execution containers to the first number of serverless execution containers within the pool of serverless execution containers or removing one or more serverless execution containers from the first number of serverless execution containers within the pool of serverless execution containers.

As shown, the series of acts 1000 also includes an act 1040 of providing additional machine learning model data to the second number of serverless execution containers. In particular, the act 1040 can involve providing additional machine learning model data to the second number of serverless execution containers in the pool of serverless execution containers. In one or more implementations, the act 1040 can include identifying additional machine learning model data after the time period. In implementations where one or more serverless execution containers are added to the serverless execution container pool, the act 1040 can include provisioning new serverless execution containers within the second number of serverless execution containers with software and packages corresponding to one or more machine learning models before providing the additional machine learning model data to the second number of serverless execution containers.

The series of acts 1000 can include various additional acts. For example, the series of acts 1000 can include acts of providing the machine learning model data and machine learning model parameters for one or more machine learning models to the first number of serverless execution containers, determining modified machine learning model parameters for the one or more machine learning models via the first number of serverless execution containers, and storing the modified machine learning model parameters in a shared storage medium. In some implementations, the one or more machine learning models include a neural network, a decision tree, bandit-based models, a logical regression model, or a support vector machine.

In one or more implementations, the series of acts 1000 includes acts of identifying the additional machine learning model data and the modified machine learning model parameters in the shared storage medium and providing the additional machine learning model data and the modified machine learning model parameters to the second number of serverless execution containers in the pool of serverless execution containers for determining further modified parameters of the one or more machine learning models. In various implementations, the online learning model includes a neural network, a decision tree, bandit-based model, a logical regression model, or a support vector machine.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the serverless computing management system to continuously updating online machine-learning models on a cloud computing device and/or a cloud computing system, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
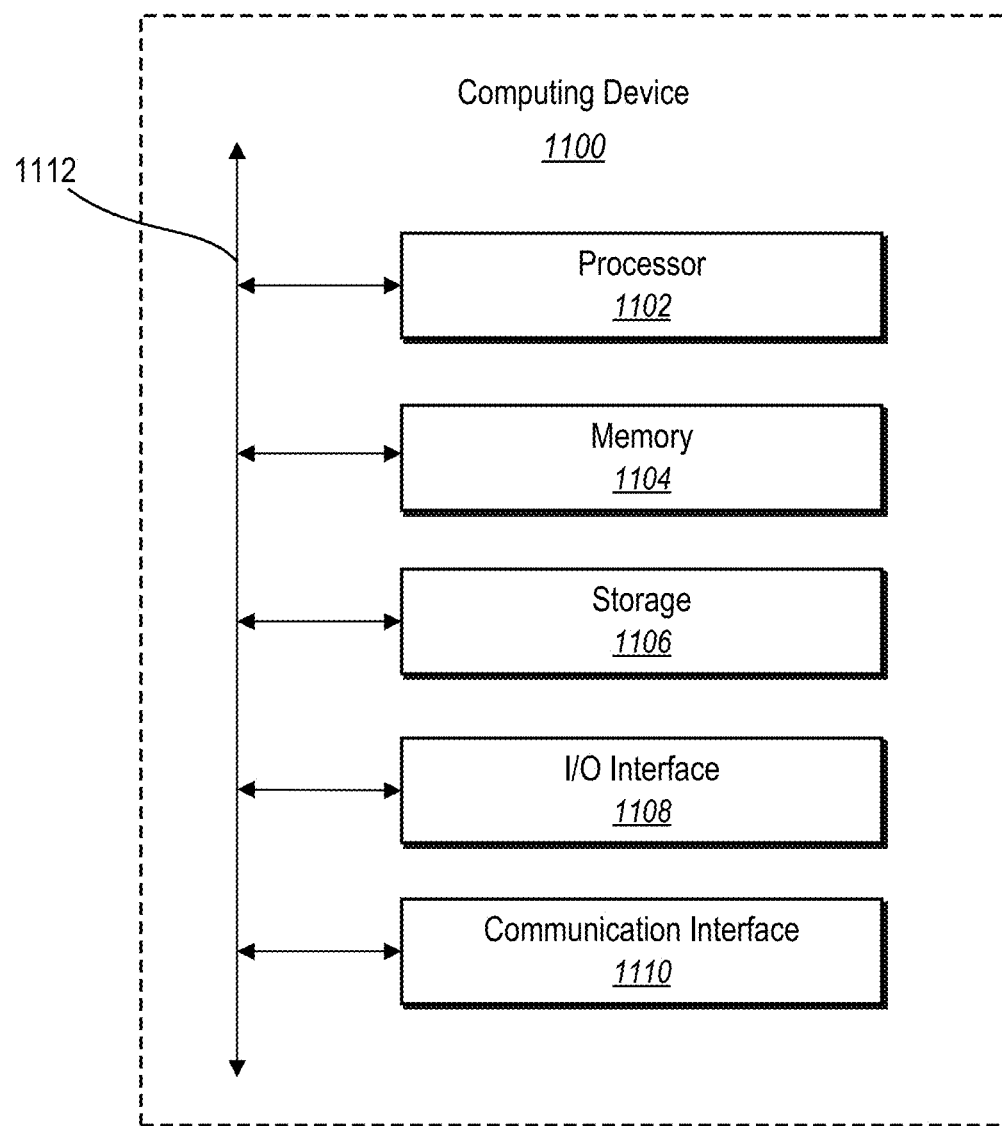
FIG. 11 illustrates a block diagram of an example computing device for implementing one or more implementations of the present disclosure.

FIG. 11 illustrates a block diagram of an example computing device 1100 that may be configured to perform one or more of the processes described above. One will appreciate that one or more computing devices, such as the server device 102, the cloud computing device 112, the client device 116, or the computing device 900. In one or more implementations, the computing device 1100 may be a non-mobile device (e.g., a desktop computer, a server device, a web server, a file server, a social networking system, a program server, an application store, or a content provider). Further, the computing device 1100 may be a server device that includes cloud-based processing and storage capabilities. In some implementations, the computing device 1100 may be a mobile device (e.g., a laptop, a tablet, a smartphone, a mobile telephone, a camera, a tracker, a watch, a wearable device, etc.).

As shown in FIG. 11, the computing device 1100 can include one or more processor(s) 1102, memory 1104, a storage device 1106, input/output ("I/O") interfaces 1108, and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other implementations. Furthermore, in certain implementations, the computing device 1100 includes fewer components than those shown in FIG. 11. Components of the computing device 1100 shown in FIG. 11 will now be described in additional detail.

In particular implementations, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive, or a combination of these or other storage devices.

As shown, the computing device 1100 includes one or more I/O interfaces 1108, which are provided to allow a user to provide input to (e.g., user strokes), receive output from, and otherwise transfer data to and from the computing device 1100. These I/O interfaces 1108 may include a mouse, keypad or a keyboard, a touch screen, camera, optical scanner, network interface, modem, other known I/O devices, or a combination of these I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
    monitor arrival patterns of machine learning model data over a time period comprising a series of time instances;
    determine a computing latency and a computing cost of processing the machine learning model data utilizing a current number of serverless execution containers from a pool of serverless execution containers for the time period;
    utilize an online learning model to determine a second number of serverless execution containers by:
        generating, utilizing parameters of the online learning model, a first adjusted computing latency and a first adjusted computing cost for a first time instance of the series of time instances by modeling a change from the current number of serverless execution containers to the second number of serverless execution containers in the pool of serverless execution containers at the first time instance;
        generating, utilizing the parameters of the online learning model, a second adjusted computing latency and a second adjusted computing cost for a second time instance of the series of time instances by modeling a change from the current number of serverless execution containers to the second number of serverless execution containers in the pool of serverless execution containers at the second time instance; and
        selecting the second number of serverless execution containers by comparing the computing latency, the computing cost, the first adjusted computing latency, the first adjusted computing cost, the second adjusted computing latency, and the second adjusted computing cost;
identify additional machine learning model data after the time period; and
provide the additional machine learning model data to the second number of serverless execution containers in the pool of serverless execution containers.

2. The non-transitory computer-readable medium of claim 1, wherein the instructions that, when executed by the at least one processor, cause the computer system to determine the second number of serverless execution containers by determining that changing a number of serverless execution containers from the current number of serverless execution containers to the second number of serverless execution containers is within a regret threshold for a current time instance.

3. The non-transitory computer-readable medium of claim 2, wherein the instructions that, when executed by the at least one processor, cause the computer system to determine that the second number of serverless execution containers is within the regret threshold by:
estimating a computing latency change and a computing cost change resulting from utilizing the second number of serverless execution containers to process the arrival patterns of the machine learning model data across the time period; and
comparing the computing latency change and the computing cost change.

4. The non-transitory computer-readable medium of claim 3, further comprising instructions that, when executed by the at least one processor, cause the computer system to determine the second number of serverless execution containers further by weighting the computing cost change by a parameter indicating a prioritization of the computing cost to the computing latency, wherein selecting the second number of serverless execution containers is further based on comparing the computing latency change to the weighted computing cost change.

5. The non-transitory computer-readable medium of claim 2, wherein the instructions that, when executed by the at least one processor, cause the computer system to determine that the second number of serverless execution containers is within the regret threshold by:
determining a computing latency change resulting from utilizing the second number of serverless execution containers to process the arrival patterns of the machine learning model data across the time period; and
comparing the computing latency change to a maximum latency increase threshold.

6. The non-transitory computer-readable medium of claim 1, further comprising instructions that, when executed by the at least one processor, cause the computer system to select the second number of serverless execution containers by:
estimating, utilizing the parameters of the online learning model, a computing latency change between the computing latency and one of the first adjusted computing latency or the second adjusted computing latency;
estimating, utilizing the parameters of the online learning model, a computing cost change between the computing cost and one of the first adjusted computing cost or the second adjusted computing cost;
comparing the computing latency change to the computing cost change and a maximum latency increase threshold; and
in response to determining that the computing latency change exceeds the computing cost change, adding one or more serverless execution containers to the current number of serverless execution containers within the pool of serverless execution containers; or
in response to determining that the computing latency change does not exceed the maximum latency increase threshold, removing one or more serverless execution containers from the current number of serverless execution containers within the pool of serverless execution containers.

7. The non-transitory computer-readable medium of claim 1, further comprising instructions that, when executed by the at least one processor, cause the computer system to determine the computing cost of processing the machine learning model data utilizing the current number of serverless execution containers by applying a serverless execution container provisioning cost to the current number of serverless execution containers.

8. The non-transitory computer-readable medium of claim 1, further comprising instructions that, when executed by the at least one processor, cause the computer system to:
provide the machine learning model data and machine learning model parameters for one or more machine learning models to the current number of serverless execution containers;
determine modified machine learning model parameters for the one or more machine learning models via the current number of serverless execution containers; and
store the modified machine learning model parameters in a shared storage medium.

9. The non-transitory computer-readable medium of claim 8, wherein the one or more machine learning models comprise a neural network, a decision tree, bandit-based model, a logical regression model, or a support vector machine.

10. The non-transitory computer-readable medium of claim 8, further comprising instructions that, when executed by the at least one processor, cause the computer system to:
identify the additional machine learning model data and the modified machine learning model parameters in the shared storage medium; and
provide the additional machine learning model data and the modified machine learning model parameters to the second number of serverless execution containers in the pool of serverless execution containers for determining further modified parameters of the one or more machine learning models.

11. A system comprising:
a memory device comprising machine learning model data and an online learning model for dynamically sizing a pool of serverless execution containers; and
at least one computing device configured to cause the system to:
monitor arrival patterns of the machine learning model data over a time period comprising a series of time instances;
provide the machine learning model data to a current number of serverless execution containers for determining modified parameters of one or more machine learning models;
determine a computing latency and a computing cost of processing the machine learning model data utilizing the current number of serverless execution containers from the pool of serverless execution containers for the time period;
determine a second number of serverless execution containers utilizing the online learning model by:
generating, utilizing parameters of the online learning model, a first adjusted computing latency and a first adjusted computing cost for a first time instance of the series of time instances by modeling a change from the current number of serverless execution containers to the second number of serverless execution containers in the pool of serverless execution containers at the first time instance;

estimating a computing latency change by comparing the computing latency with the first adjusted computing latency and a computing cost change by comparing the computing cost with the first adjusted computing cost; and selecting the second number of serverless execution containers by comparing the computing latency change and the computing cost change; and provide additional machine learning model data to the second number of serverless execution containers in the pool of serverless execution containers.

12. The system of claim 11, wherein the at least one computing device is further configured to cause the system to:

provide the machine learning model data and machine learning model parameters to the one or more machine learning models for processing via the current number of serverless execution containers;

determine modified machine learning model parameters for the one or more machine learning models via the current number of serverless execution containers; and store the modified machine learning model parameters in a shared storage medium.

13. The system of claim 12, wherein the at least one computing device is further configured to cause the system to:

identify the modified machine learning model parameters in the shared storage medium; and provide the modified machine learning model parameters to the second number of serverless execution containers in the pool of serverless execution containers in connection with providing the additional machine learning model data to the second number of serverless execution containers.

14. The system of claim 11, wherein the online learning model comprises a neural network, a decision tree, bandit-based model, a logical regression model, or a support vector machine.

15. The system of claim 11, wherein the at least one computing device is further configured to cause the system to determine the second number of serverless execution containers by:

estimating the computing latency change and the computing cost change resulting from utilizing the second number of serverless execution containers to process the arrival patterns of the machine learning model data; and selecting the second number of serverless execution containers by comparing the computing latency change and the computing cost change, wherein the second number of serverless execution containers is greater than the current number of serverless execution containers.

16. The system of claim 11, wherein the at least one computing device is further configured to cause the system to determine the second number of serverless execution containers by:

estimating the computing latency change resulting from utilizing the second number of serverless execution containers to process the arrival patterns of the machine learning model data; and selecting the second number of serverless execution containers by comparing the computing latency change to a maximum latency increase limit, wherein the second number of serverless execution containers is less than the current number of serverless execution containers.

17. In a digital serverless environment for continuously updating online machine-learning models, a computer-implemented method for dynamically adjusting a plurality of serverless execution containers, comprising:

monitoring arrival patterns of machine learning model data over a time period comprising a series of time instance;

providing the machine learning model data and machine learning model parameters for one or more machine learning models to a current number of serverless execution containers in a pool of serverless execution containers;

determining modified machine learning model parameters for the one or more machine learning models via the current number of serverless execution containers;

determining a computing latency and a computing cost of processing the machine learning model data utilizing the current number of serverless execution containers from the pool of serverless execution containers for the time period;

determining a second number of serverless execution containers in the pool of serverless execution containers that maximizes computing latency reduction by:

generating, utilizing parameters of the online machine-learning models, a first adjusted computing latency and a first adjusted computing cost for a first time instance of the series of time instances by modeling a change from the current number of serverless execution containers to the second number of serverless execution containers in the pool of serverless execution containers at the first time instance;

estimating a computing latency change by comparing the computing latency with the first adjusted computing latency and a computing cost change by comparing the computing cost with the first adjusted computing cost; and selecting the second number of serverless execution containers by comparing the computing latency change and the computing cost change; and providing additional machine learning model data and the modified machine learning model parameters to the second number of serverless execution containers.

18. The computer-implemented method of claim 17, further comprising:

storing the modified machine learning model parameters at a shared storage medium; and identifying, before providing the modified machine learning model parameters to the second number of serverless execution containers, the modified machine learning model parameters at the shared storage medium.

19. The computer-implemented method of claim 17, further comprising provisioning new serverless execution containers within the second number of serverless execution containers with software and packages corresponding to the one or more machine learning models before providing the additional machine learning model data to the second number of serverless execution containers.

20. The computer-implemented method of claim 17, wherein the second number of serverless execution containers is greater than the current number of serverless execution containers.

* * * * *